United States Patent
Yuan et al.

(10) Patent No.: US 11,750,785 B2
(45) Date of Patent: Sep. 5, 2023

(54) VIDEO SIGNAL PROCESSING METHOD AND APPARATUS

(71) Applicant: HUAWEI TECHNOLOGIES CO., LTD., Guangdong (CN)

(72) Inventors: Le Yuan, Shenzhen (CN); Zheng Wang, Shenzhen (CN); Renjian Wu, Shenzhen (CN); Fang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 261 days.

(21) Appl. No.: 17/110,931

(22) Filed: Dec. 3, 2020

(65) Prior Publication Data

US 2021/0092342 A1 Mar. 25, 2021

Related U.S. Application Data

(63) Continuation of application No. PCT/CN2019/090709, filed on Jun. 11, 2019.

(30) Foreign Application Priority Data

Jul. 5, 2018 (CN) .......................... 201810743840.5
Jul. 19, 2018 (CN) .......................... 201810799589.4

(51) Int. Cl.
*H04N 9/873* (2006.01)
*H04N 9/77* (2006.01)

(52) U.S. Cl.
CPC .............. *H04N 9/873* (2013.01); *H04N 9/77* (2013.01)

(58) Field of Classification Search
CPC .................................. H04N 9/77; H04N 9/873
See application file for complete search history.

(56) References Cited

U.S. PATENT DOCUMENTS

| 9,654,755 | B2 | 5/2017 | Wallace |
| 2012/0200589 | A1 | 8/2012 | Min et al. |

(Continued)

FOREIGN PATENT DOCUMENTS

| CN | 103069809 A | 4/2013 |
| CN | 104995903 A | 10/2015 |

(Continued)

OTHER PUBLICATIONS

Office Action issued in Chinese Application No. 201810799589.4 dated Apr. 1, 2019, 5 pages (with English translation).

(Continued)

*Primary Examiner* — Kyle M Lotfi
(74) *Attorney, Agent, or Firm* — HUAWEI TECHNOLOGIES CO., LTD.

(57) ABSTRACT

A video signal processing method which includes: performing luminance mapping and color gamut conversion after color space conversion and non-linear space-to-linear space conversion are performed on a to-be-processed video signal, performing linear space-to-non-linear space conversion and color space conversion on the color gamut-converted signal, and then performing saturation mapping on the converted signal, to obtain a video signal that matches a format supported by a display device, so that the to-be-processed video signal can be correctly displayed on the display device.

17 Claims, 10 Drawing Sheets

(56) References Cited

U.S. PATENT DOCUMENTS

| | | |
|---|---|---|
| 2016/0005349 A1 | 1/2016 | Atkins et al. |
| 2016/0205370 A1 | 7/2016 | Wallace |
| 2016/0309154 A1 | 10/2016 | Rusanovskyy et al. |
| 2017/0186141 A1 | 6/2017 | Ha et al. |
| 2018/0013927 A1 | 1/2018 | Atkins |
| 2018/0300862 A1* | 10/2018 | Keating ............... H04N 1/6075 |

FOREIGN PATENT DOCUMENTS

| | | |
|---|---|---|
| CN | 105009580 A | 10/2015 |
| CN | 105794216 A | 7/2016 |
| CN | 106464892 A | 2/2017 |
| CN | 107154059 A | 9/2017 |
| CN | 107203974 A | 9/2017 |
| CN | 107211076 A | 9/2017 |
| CN | 107533832 A | 1/2018 |
| CN | 107736024 A | 2/2018 |
| CN | 107786865 A | 3/2018 |
| CN | 107995497 A | 5/2018 |
| CN | 108781246 A | 11/2018 |
| CN | 108882028 A | 11/2018 |
| EP | 3051487 A1 | 8/2016 |
| EP | 3054417 A1 | 8/2016 |
| JP | 4807412 B2 | 11/2011 |
| JP | 2014093617 A | 5/2014 |
| JP | 2017033534 A | 2/2017 |
| JP | 2017092964 A | 5/2017 |
| JP | 2017168101 A | 9/2017 |
| JP | 2018093530 A | 6/2018 |
| WO | 2017102606 A1 | 6/2017 |

OTHER PUBLICATIONS

Office Action issued in Chinese Application No. 201810799589.4 dated Jan. 16, 2019, 5 pages.

PCT International Search Report and Written Opinion issued in International Application No. PCT/CN2019/090709 dated Sep. 10, 2019, 16 pages (with English translation).

Office Action issued in Japanese Application No. 2021-5000066 dated Mar. 15, 2022, 4 pages (with English translation).

Extended European Search Report issued in European Application No. 19830403.2 dated Jun. 2, 2021, 9 pages.

* cited by examiner

VIDEO SIGNAL PROCESSING METHOD AND APPARATUS

CROSS-REFERENCE TO RELATED APPLICATIONS

This application is a continuation of International Application No. PCT/CN2019/090709, filed on Jun. 11, 2019, which claims priority to Chinese Patent Application No. 201810743840.5, filed on Jul. 5, 2018 and Chinese Patent Application No. 201810799589.4, filed on Jul. 19, 2018. The disclosures of the aforementioned applications are hereby incorporated by reference in their entireties.

TECHNICAL FIELD

This application relates to the field of multimedia technologies, and in particular, to a video signal processing method and apparatus.

BACKGROUND

When playing a video, a video source device sends the to-be-played video to a playing device, such as a set top box, and then the playing device sends the received video to a display such as a television set or a projector by using a high definition multimedia interface (HDMI) interface, and then the display play s the received video.

Currently, a display with the HDMI interface mainly supports two types of video formats. One type is a video format of a standard dynamic range (SDR) type, and the video format of the SDR type includes a plurality of SDR video formats. For example, based on a color gamut difference, the video format of the SDR type includes a BT.709 video format, a BT.2020 video format, and the like. The other type is a video format of a high dynamic range (HDR) type. Similarly, the video format of the HDR type also includes a plurality of HDR video formats, such as an HDR video format of a hybrid log-gamma (HLG) curve (HDR HLG) or an HDR video format of a perceptual quantizer (PQ) curve (HDR PQ).

Generally, a display can support limited video formats. For example, an SDR television set can support only playback of the video format of the SDR type, and does not support play back of the video format of the HDR type. For another example, a television set that supports playback of the HDR video format of the PQ curve cannot support the HDR video format of the HLG curve. If a format of a video received by the display is inconsistent with a video format that can be supported by the display, problems such as severe picture distortion, inaccurate color performance, and loss of details may be caused when the display plays the video.

SUMMARY

Embodiments of this application provide a video signal processing method and apparatus. When a format of a video received by a player is inconsistent with a video format supported by a display, the format of the received video may be converted, to make the format consistent with the video format supported by the display, so that the display correctly plays the video. This avoids problems such as picture distortion, inaccurate color performance, and loss of details.

According to a first aspect, an embodiment of this application provides a video signal processing method, including: performing color space conversion on a to-be-processed video signal to obtain a first non-linear RGB signal; converting the first non-linear RGB signal based on an electro-optical transfer function, to obtain a first linear RGB signal; performing luminance mapping on the first linear RGB signal to obtain a second linear RGB signal, where a luminance value range corresponding to the second linear RGB signal is the same as a luminance value range corresponding to a display device; performing color gamut conversion on the second linear RGB signal to obtain a third linear RGB signal, where a color gamut corresponding to the third linear RGB signal is the same as a color gamut corresponding to the display device; converting the third linear RGB signal based on an optical-electro transfer function, to obtain a second non-linear RGB signal; performing color space conversion on the second non-linear RGB signal to obtain a first luminance-chrominance signal; and performing saturation mapping on a chrominance component of the first luminance-chrominance signal to obtain a second luminance-chrominance signal.

In this embodiment of this application, luminance processing is first performed on the to-be-processed video signal in a linear space, and then, color gamut conversion is performed on a luminance-processed signal, a color gamut-converted signal is converted into a non-linear space, and saturation processing is performed, to output a signal that matches a format supported by a display, so that the display correctly plays the video. This avoids problems such as picture distortion, inaccurate color performance, and loss of details. In addition, in this embodiment of this application, luminance processing and color gamut processing are combined, and after luminance of the video signal is processed, the chrominance component is correspondingly adjusted based on a luminance mapping curve and a luminance value of a luminance processing input signal, so that both the luminance and saturation of the video signal can be effectively adjusted. In the foregoing method, a relationship is formed for the luminance, a color gamut, and the saturation in terms of processing, so that signal conversion complexity is reduced, and signal conversion efficiency is improved.

In a possible implementation, the to-be-processed video signal is a HDR signal, and the second luminance-chrominance signal is a SDR signal.

According to the video signal processing method provided in this embodiment of this application, the HDR signal may be converted into the SDR signal, so that the HDR signal can be displayed on a display screen that supports only an SDR signal format.

In a possible implementation, the performing luminance mapping on the first linear RGB signal includes: calculating a temporary luminance value based on each primary color value of the first linear RGB signal; converting the temporary luminance value based on a preset luminance mapping curve, to obtain an adjustment coefficient; and multiplying each primary color value by the adjustment coefficient to obtain the second linear RGB signal.

In this embodiment of this application, the luminance value of the luminance processing input signal is mapped based on the luminance mapping curve, to obtain the adjustment coefficient, and a luminance processing output signal is further obtained based on the adjustment coefficient and each primary color value of the input signal.

In a possible implementation, the temporary luminance value is calculated according to the following formula.

$$Y = C_1 \times R + C_2 \times G + C_3 \times B, \text{ where}$$

Y is the temporary luminance value, R, G, and B are respectively primary color values of the first linear RGB signal, $C_1=0.2627$, $C_2=0.678$, and $C_3=0.0593$.

A specific manner of calculating the temporary luminance value is provided in this embodiment of this application. Each primary color value of the input signal is multiplied by the corresponding coefficient, and a sum is obtained to obtain the temporary luminance value.

In a possible implementation, the converting the temporary luminance value based on a preset luminance mapping curve includes: determining, by using a first mapping relationship table, the adjustment coefficient corresponding to the temporary luminance value, where the first mapping relationship table is used to store a horizontal coordinate value and a vertical coordinate value of at least one sampling point on the luminance mapping curve.

In this embodiment of this application, the first mapping relationship table stores the horizontal coordinate value and the vertical coordinate value of the at least one sampling point on the luminance mapping curve, and the adjustment coefficient corresponding to the temporary luminance value may be determined by searching the first mapping relationship table, to obtain the luminance processing output signal based on the adjustment coefficient and each primary color value of the input signal.

In a possible implementation, the performing saturation mapping on the chrominance component of the first luminance-chrominance signal includes: converting the temporary luminance value based on a preset saturation mapping curve, to obtain a saturation factor; and multiplying a product of the saturation factor and a preset chrominance adjustment factor by a chrominance value of the chrominance component, to obtain an adjusted chrominance value.

A specific manner of adjusting the chrominance component is provided in this embodiment of this application. The saturation factor is obtained by using the saturation mapping curve, and then, the chrominance component of the first luminance-chrominance signal is adjusted based on the saturation factor, to obtain the adjusted chrominance value.

In a possible implementation, the converting the temporary luminance value based on a preset saturation mapping curve includes: determining, by using a second mapping relationship table, the saturation factor corresponding to the temporary luminance value, where the second mapping relationship table is used to store a horizontal coordinate value and a vertical coordinate value of at least one sampling point on the saturation mapping curve.

In this embodiment of this application, the second mapping relationship table stores the horizontal coordinate value and the vertical coordinate value of the at least one sampling point on the saturation mapping curve, and the saturation factor corresponding to the temporary luminance value may be determined by searching the second mapping relationship table, to obtain the adjusted chrominance value by adjusting the chrominance component of the first luminance-chrominance signal based on the saturation factor.

In a possible implementation, a color format of the first luminance-chrominance signal includes a YUV format or a YCbCr format and another luminance-chrominance (YCC) color space format.

According to a second aspect, an embodiment of this application provides a video signal processing method, including: performing saturation mapping on a chrominance component of a to-be-processed video signal to obtain a first luminance-chrominance signal; performing color space conversion on the first luminance-chrominance signal to obtain a first non-linear RGB signal; converting the first non-linear RGB signal based on an electro-optical transfer function, to obtain a first linear RGB signal; performing luminance mapping on the first linear RGB signal to obtain a second linear RGB signal, where a luminance value range corresponding to the second linear RGB signal is the same as a luminance value range corresponding to a display device; performing color gamut conversion on the second linear RGB signal to obtain a third linear RGB signal, where a color gamut corresponding to the third linear RGB signal is the same as a color gamut corresponding to the display device; converting the third linear RGB signal based on an optical-electro transfer function, to obtain a second non-linear RGB signal; and performing color space conversion on the second non-linear RGB signal to obtain a second luminance-chrominance signal.

In this embodiment of this application, saturation processing is first performed on the to-be-processed video signal, and then, luminance processing and color gamut conversion are performed on a saturation-processed signal in a linear space, and a color gamut-converted signal is converted into a non-linear space, to output a signal that matches a format supported by a display, so that the display correctly plays the video. This avoids problems such as picture distortion, inaccurate color performance, and loss of details. In addition, in this embodiment of this application, luminance processing and color gamut processing are combined, and before luminance of the video signal is processed, the chrominance component is correspondingly adjusted based on a luminance mapping curve, so that both the luminance and saturation of the video signal can be effectively adjusted. In the foregoing method, corresponding saturation mapping is performed in a luminance, color gamut, and saturation processing process, so that a relationship of the foregoing methods is formed in terms of processing. This reduces signal conversion complexity, and improving signal conversion efficiency.

In a possible implementation, the to-be-processed video signal is a HDR signal, and the second luminance-chrominance signal is a SDR signal.

According to the video signal processing method provided in this embodiment of this application, the HDR signal may be converted into the SDR signal, so that the HDR signal can be displayed on a display screen that supports only an SDR signal format.

In a possible implementation, the performing saturation mapping on a chrominance component of a to-be-processed video signal includes: converting a luminance component of the to-be-processed video signal based on a preset saturation mapping curve, to obtain a saturation factor; and multiplying a product of the saturation factor and a preset chrominance adjustment factor by a chrominance value of the chrominance component, to obtain an adjusted chrominance value.

A specific manner of adjusting the chrominance component is provided in this embodiment of this application. The saturation factor is obtained by using the saturation mapping curve, and then, a chrominance component of the first luminance-chrominance signal is adjusted based on the saturation factor, to obtain the adjusted chrominance value.

In a possible implementation, the converting a luminance component of the to-be-processed video signal based on a preset saturation mapping curve includes: determining, by using a first mapping relationship table, the saturation factor corresponding to the luminance component of the to-be-processed video signal, where the first mapping relationship table is used to store a horizontal coordinate value and a vertical coordinate value of at least one sampling point on the saturation mapping curve.

In this embodiment of this application, the first mapping relationship table stores the horizontal coordinate value and the vertical coordinate value of the at least one sampling point on the saturation mapping curve, and the saturation factor corresponding to the luminance component of the to-be-processed video signal may be determined by searching the first mapping relationship table, to obtain the adjusted chrominance value by adjusting the chrominance component of the first luminance-chrominance signal based on the saturation factor.

In a possible implementation, the performing luminance mapping on the first linear RGB signal includes, calculating a temporary luminance value based on each primary color value of the first linear RGB signal; converting the temporary luminance value based on a preset luminance mapping curve, to obtain an adjustment coefficient, and multiplying each primary color value by the adjustment coefficient to obtain the second linear RGB signal.

In this embodiment of this application, a luminance value of a luminance processing input signal is mapped based on the luminance mapping curve, to obtain the adjustment coefficient, and a luminance processing output signal is further obtained based on the adjustment coefficient and each primary color value of the input signal.

In a possible implementation, the temporary luminance value is calculated according to the following formula.

$$Y = C_1 \times R + C_2 \times G + C_3 \times B, \text{ where}$$

Y is the temporary luminance value, R, G, and B are respectively primary color values of the first linear RGB signal, $C_1 = 0.2627$, $C_2 = 0.678$, and $C_3 = 0.0593$.

A specific manner of calculating the temporary luminance value is provided in this embodiment of this application. Each primary color value of the input signal is multiplied by the corresponding coefficient, and a sum is obtained to obtain the temporary luminance value.

In a possible implementation, the converting the temporary luminance value based on a preset luminance mapping curve includes: determining, by using a second mapping relationship table, the adjustment coefficient corresponding to the temporary luminance value, where the second mapping relationship table is used to store a horizontal coordinate value and a vertical coordinate value of at least one sampling point on the luminance mapping curve.

In this embodiment of this application, the second mapping relationship table stores the horizontal coordinate value and the vertical coordinate value of the at least one sampling point on the luminance mapping curve, and the adjustment coefficient corresponding to the temporary luminance value may be determined by searching the second mapping relationship table, to obtain the luminance processing output signal based on the adjustment coefficient and each primary color value of the input signal.

In a possible implementation, a color format of the first luminance-chrominance signal includes a YUV format or a YCbCr format and another luminance-chrominance (YCC) color space format.

According to a third aspect, an embodiment of this application provides a video signal processing method, including: performing color space conversion and non-linear space-to-linear space conversion on a to-be-processed video signal to obtain a first linear RGB signal; converting the first linear RGB signal into a second linear RGB signal through luminance mapping; converting the second linear RGB signal into a non-linear RGB signal based on an optical-electro transfer function; and performing color space conversion on the non-linear RGB signal to obtain a processed video signal, where a signal format of the processed video signal adapts to a display device.

In this embodiment of this application, after the to-be-processed video signal is converted into the first linear RGB signal, luminance mapping is performed on the first linear RGB signal, and linear space-to-non-linear space conversion and color space conversion are performed on a luminance-mapped signal, to obtain a video signal that matches the display device, so that the display device correctly plays the video. This avoids problems such as picture distortion, inaccurate color performance, and loss of details.

In a possible implementation, the to-be-processed video signal is a hybrid log-gamma HLG signal, and the processed video signal is a perceptual quantizer (PQ) signal.

According to the video signal processing method provided in this embodiment of this application, an HDR HLG signal may be converted into an HDR PQ signal, so that the HDR HLG signal can be displayed on a display screen that supports an HDR PQ signal format.

In a possible implementation, the non-linear space-to-linear space conversion is an inverse process of HLG optical-electro transfer.

In a possible implementation, the converting the first linear RGB signal into a second linear RGB signal through luminance mapping includes: calculating a scene luminance value based on each primary color value of the first linear RGB signal; adjusting the scene luminance value based on a rated display luminance peak value and a system gamma value of the display device, to obtain a display luminance value; and multiplying each primary color value by a ratio of the display luminance value to the scene luminance value, to obtain the second linear RGB signal.

In a possible implementation, the display luminance value is obtained according to the following formula:

$$Y_d = Y_s^\gamma * L_W, \text{ where}$$

$Y_d$ is the display luminance value, $Y_s$ is the scene luminance value, $L_W$ is the rated display luminance peak value, $\gamma$ is the system gamma value, and $\gamma = 1.2 + 0.42 * \log_{10}(L_W/1000)$.

In this embodiment of this application, the HDR HLG signal may be converted into the HDR PQ signal. Luminance processing is performed on the HDR HLG signal, to convert the HDR HLG signal into the HDR PQ signal, so that the HDR HLG signal is correctly displayed on a display device that supports the HDR PQ signal.

According to a fourth aspect, an embodiment of this application provides a video signal processing method, including: performing color space conversion on a to-be-processed video signal to obtain a first non-linear RGB signal; converting the first non-linear RGB signal based on an electro-optical transfer function, to obtain a first linear RGB signal; performing color gamut conversion on the first linear RGB signal to obtain a second linear RGB signal, where a color gamut corresponding to the second linear RGB signal is the same as a color gamut corresponding to a display device; performing luminance mapping on the second linear RGB signal to obtain a third linear RGB signal, where a luminance value range corresponding to the third linear RGB signal is the same as a luminance value range corresponding to the display device; converting the third linear RGB signal based on an optical-electro transfer function, to obtain a second non-linear RGB signal; performing color space conversion on the second non-linear RGB signal to obtain a first luminance-chrominance signal; and performing saturation mapping on a chrominance component of the first luminance-chrominance signal to obtain a second luminance-chrominance signal.

In this embodiment of this application, color space conversion may be first performed on the to-be-processed video signal, and then, color gamut conversion is first performed on a converted video signal in a linear space, and then luminance processing is performed on a color gamut-converted signal, and a luminance-processed signal is converted into a non-linear space, to output a signal that matches a format supported by a display, so that the display correctly plays the video. This avoids problems such as picture distortion, inaccurate color performance, and loss of details. In addition, in this embodiment of this application, luminance processing and color gamut processing are combined, and corresponding saturation mapping is performed in a luminance processing process, so that a relationship of the foregoing methods is formed in terms of processing. This reduces signal conversion complexity and improving signal conversion efficiency.

In a possible implementation, the to-be-processed video signal is a SDR signal, and the second luminance-chrominance signal is a HDR signal.

This embodiment of this application may be applicable to a scenario in which the SDR signal is converted into the HDR signal, so that the SDR signal can be correctly displayed on a display screen that supports an HDR signal format.

In a possible implementation, the performing luminance mapping on the second linear RGB signal includes: calculating a temporary luminance value based on each primary color value of the second linear RGB signal; converting the temporary luminance value based on a preset luminance mapping curve, to obtain an adjustment coefficient; and multiplying each primary color value by the adjustment coefficient to obtain the third linear RGB signal.

In this embodiment of this application, a luminance value of a luminance processing input signal is mapped based on the luminance mapping curve, to obtain the adjustment coefficient, and a luminance processing output signal is further obtained based on the adjustment coefficient and each primary color value of the input signal.

In a possible implementation, the temporary luminance value is calculated according to the following formula.

$$Y = C_1 \times R + C_2 \times G + C_3 \times B, \text{ where}$$

Y is the temporary luminance value, R, G, and B are respectively primary color values of the second linear RGB signal, $C_1=0.2627$, $C_2=0.678$, and $C_3=0.0593$.

A specific manner of calculating the temporary luminance value is provided in this embodiment of this application. Each primary color value of the input signal is multiplied by the corresponding coefficient, and a sum is obtained to obtain the temporary luminance value.

In a possible implementation, the converting the temporary luminance value based on a preset luminance mapping curve includes: determining, by using a first mapping relationship table, the adjustment coefficient corresponding to the temporary luminance value, where the first mapping relationship table is used to store a horizontal coordinate value and a vertical coordinate value of at least one sampling point on the luminance mapping curve.

In this embodiment of this application, the first mapping relationship table stores the horizontal coordinate value and the vertical coordinate value of the at least one sampling point on the luminance mapping curve, and the adjustment coefficient corresponding to the temporary luminance value may be determined by searching the first mapping relationship table, to obtain the luminance processing output signal based on the adjustment coefficient and each primary color value of the input signal.

In a possible implementation, the performing saturation mapping on a chrominance component of the first luminance-chrominance signal includes: converting the temporary luminance value based on a preset saturation mapping curve, to obtain a saturation factor; and multiplying a product of the saturation factor and a preset chrominance adjustment factor by a chrominance value of the chrominance component, to obtain an adjusted chrominance value.

A specific manner of adjusting the chrominance component is provided in this embodiment of this application. The saturation factor is obtained by using the saturation mapping curve, and then, the chrominance component of the first luminance-chrominance signal is adjusted based on the saturation factor, to obtain the adjusted chrominance value.

In a possible implementation, the converting the temporary luminance value based on a preset saturation mapping curve includes: determining, by using a second mapping relationship table, the saturation factor corresponding to the temporary luminance value, where the second mapping relationship table is used to store a horizontal coordinate value and a vertical coordinate value of at least one sampling point on the saturation mapping curve.

In this embodiment of this application, the second mapping relationship table stores the horizontal coordinate value and the vertical coordinate value of the at least one sampling point on the saturation mapping curve, and the saturation factor corresponding to the temporary luminance value may be determined by searching the second mapping relationship table, to obtain the adjusted chrominance value by adjusting the chrominance component of the first luminance-chrominance signal based on the saturation factor.

In a possible implementation, a color format of the first luminance-chrominance signal includes a YUV format or a YCbCr format.

According to a fifth aspect, an embodiment of this application provides a video signal processing method, including: performing luminance processing and color gamut processing on an original input signal in a first space, to obtain a first output signal, where the luminance processing is based on a luminance mapping relationship, and the luminance mapping relationship represents a correspondence between an initial luminance value before luminance mapping and a luminance value after the luminance mapping; converting the first output signal into a second space to obtain a saturation processing input signal; and performing saturation processing on the saturation processing input signal in the second space based on a saturation mapping relationship, to obtain a target output signal, where the saturation mapping relationship is determined based on the luminance mapping relationship, the saturation mapping relationship represents a correspondence between the initial luminance value before the luminance mapping and a saturation mapping coefficient, and the saturation mapping coefficient is used to adjust a chrominance component of the saturation processing input signal.

In this embodiment of this application, luminance conversion and color gamut conversion may be first performed on the original input signal. Because a luminance change affects perception of a human eye to color saturation, the color saturation needs to be adjusted and compensated for during luminance processing, so that a processed color is closer to a color of the original input signal. Saturation processing and luminance processing are combined, so that color accuracy of the target output signal is improved, distortion of an output video picture is reduced, and user experience is improved.

In a possible implementation, the luminance mapping relationship is a luminance mapping relationship in a linear space. That the saturation mapping relationship is determined based on the luminance mapping relationship includes, converting the luminance mapping relationship in the linear space into a non-linear space in which the saturation processing input signal is located, to obtain the saturation mapping relationship.

A specific manner of determining the saturation mapping relationship based on the luminance mapping relationship is provided in this embodiment of this application. When the luminance mapping relationship is the luminance mapping relationship in the linear space, the luminance mapping relationship in the linear space is converted into the non-linear space in which the saturation processing input signal is located, to obtain the saturation mapping relationship.

In a possible implementation, the luminance mapping relationship is a luminance mapping relationship in a non-linear space. That the saturation mapping relationship is determined based on the luminance mapping relationship includes: when the non-linear space in which the luminance mapping relationship is located is inconsistent with a non-linear space in which the saturation processing input signal is located, converting the luminance mapping relationship in the non-linear space into a luminance mapping relationship in a linear space; and converting the luminance mapping relationship in the linear space into the non-linear space in which the saturation processing input signal is located, to obtain the saturation mapping relationship.

Another specific manner of determining the saturation mapping relationship based on the luminance mapping relationship is provided in this embodiment of this application. When the luminance mapping relationship is the luminance mapping relationship in the non-linear space, the luminance mapping relationship in the non-linear space is converted into the luminance mapping relationship in the linear space, and then the luminance mapping relationship in the linear space is converted into the non-linear space in which the saturation processing input signal is located, to obtain the saturation mapping relationship.

In a possible implementation, the performing luminance processing and color gamut processing on an original input signal in a first space, to obtain a first output signal includes: converting the original input signal into the first space to obtain a first non-linear RGB signal; performing electro-optical transfer on the first non-linear RGB signal to obtain a luminance processing input signal; determining, based on the luminance mapping relationship, a luminance value that is obtained after the luminance mapping and that corresponds to a luminance value of the luminance processing input signal; obtaining a luminance-mapped signal based on a luminance value gain and the luminance processing input signal, where the luminance value gain is a ratio of the luminance value obtained after the luminance mapping to the luminance value of the luminance processing input signal; and converting the luminance-mapped signal into a color gamut in which the target output signal is located, to obtain the first output signal.

In this embodiment of this application, luminance processing may be first performed on the original input signal in the first space, and then color gamut processing is performed on the luminance-processed signal to obtain the first output signal.

In a possible implementation, the performing luminance processing and color gamut processing on an original input signal in a first space, to obtain a first output signal includes: converting the original input signal into the first space to obtain a first non-linear RGB signal; performing electro-optical transfer on the first non-linear RGB signal to obtain a first linear RGB signal; converting the first linear RGB signal into a color gamut in which the target output signal is located, to obtain a luminance processing input signal; determining, based on the luminance mapping relationship, a luminance value that is obtained after the luminance mapping and that corresponds to a luminance value of the luminance processing input signal; and obtaining the first output signal based on a luminance value gain and the luminance processing input signal, where the luminance value gain is a ratio of a luminance value of the first output signal to the luminance value of the luminance processing input signal.

In this embodiment of this application, color gamut processing may be first performed on the original input signal in the first space, and then luminance processing is performed on a color gamut-processed signal to obtain the first output signal.

In a possible implementation, the performing saturation processing on the saturation processing input signal in the second space based on a saturation mapping relationship, to obtain a target output signal includes: obtaining a saturation mapping coefficient based on the luminance value of the luminance processing input signal and the saturation mapping relationship; adjusting the chrominance component of the saturation processing input signal based on the saturation mapping coefficient, to obtain an adjusted chrominance component; and obtaining the target output signal based on the luminance value of the saturation processing input signal and the adjusted chrominance component.

A specific saturation processing manner is provided in this embodiment of this application. The saturation mapping coefficient is obtained based on the luminance value of the luminance processing input signal and the saturation mapping relationship, and then, the chrominance component of the luminance processing input signal is adjusted based on the saturation mapping coefficient, to obtain the adjusted chrominance component, and the target output signal is obtained with reference to the luminance value of the saturation processing input signal. Saturation processing and luminance processing are combined, so that color accuracy of the target output signal is improved, distortion of an output video picture is reduced, and user experience is improved.

In a possible implementation, the chrominance component includes a first chrominance component and a second chrominance component. The adjusting the chrominance component of the saturation processing input signal based on the saturation mapping coefficient includes: determining a first saturation adjustment factor based on a first gain coefficient and the saturation mapping coefficient; determining a second saturation adjustment factor based on a second gain coefficient and the saturation mapping coefficient; adjusting the first chrominance component based on the first saturation adjustment factor; and adjusting the second chrominance component based on the second saturation adjustment factor.

In this embodiment of this application, the saturation processing input signal and the saturation processing output signal each include two chrominance components, and the two chrominance components are separately adjusted based on the saturation mapping coefficient to implement saturation processing, so that color accuracy of the target output signal is improved, distortion of an output video picture is reduced, and user experience is improved.

In a possible implementation, the original input signal is a HDR signal, and the target output signal is a SDR signal.

In this embodiment of this application, the HDR signal may be converted into the SDR signal, so that the HDR signal can be correctly played on a display device that supports the SDR signal.

In a possible implementation, the original input signal is a HDR HLG signal of a hybrid log-gamma curve, or the original input signal is a HDR PQ signal of a perceptual quantizer curve.

In this embodiment of this application, the HDR HLG signal may be converted into the HDR PQ signal, so that the HDR HLG signal can be correctly played on a display device that supports the HDR PQ signal.

In a possible implementation, the original input signal is a SDR signal, and the target output signal is a HDR signal.

In this embodiment of this application, the SDR signal may be converted into the HDR signal, so that the SDR signal can be correctly played on a display device that supports the HDR signal.

According to a sixth aspect, an embodiment of this application provides a video signal processing method, including, performing saturation processing on an original input signal in a first space based on a saturation mapping relationship, to obtain a saturation processing output signal, where the saturation mapping relationship is determined based on a luminance mapping relationship, the saturation mapping relationship represents a correspondence between a luminance value of the original input signal and a saturation mapping coefficient, the saturation mapping coefficient is used to adjust a chrominance component of the original input signal, and the luminance mapping relationship represents a correspondence between an initial luminance value before luminance mapping and a luminance value after the luminance mapping; converting the saturation processing output signal into a second space to obtain a first input signal; and performing luminance processing and color gamut processing on the first input signal in the second space, to obtain a target output signal.

In this embodiment of this application, saturation processing may be first performed on the original input signal, and then, luminance conversion and color gamut conversion are performed on the saturation processing output signal. Because a luminance change affects perception of a human eye to color saturation, the color saturation needs to be adjusted and compensated for during luminance processing, so that a processed color is closer to a color of the original input signal. Saturation processing and luminance processing are combined, so that color accuracy of the target output signal is improved, distortion of an output video picture is reduced, and user experience is improved.

In a possible implementation, the luminance mapping relationship is a luminance mapping relationship in a linear space. That the saturation mapping relationship is determined based on the luminance mapping relationship includes: converting the luminance mapping relationship in the linear space into a non-linear space in which the original input signal is located, to obtain the saturation mapping relationship.

A specific manner of determining the saturation mapping relationship based on the luminance mapping relationship is provided in this embodiment of this application. When the luminance mapping relationship is the luminance mapping relationship in the linear space, the luminance mapping relationship in the linear space is converted into a non-linear space in which a saturation processing input signal is located, to obtain the saturation mapping relationship.

In a possible implementation, the luminance mapping relationship is a luminance mapping relationship in a non-linear space. That the saturation mapping relationship is determined based on the luminance mapping relationship includes: when the non-linear space in which the luminance mapping relationship is located is inconsistent with a non-linear space in which the original input signal is located, converting the luminance mapping relationship in the non-linear space into a luminance mapping relationship in a linear space; and converting the luminance mapping relationship in the linear space into the non-linear space in which the original input signal is located, to obtain the saturation mapping relationship.

Another specific manner of determining the saturation mapping relationship based on the luminance mapping relationship is provided in this embodiment of this application. When the luminance mapping relationship is the luminance mapping relationship in the non-linear space, the luminance mapping relationship in the non-linear space is converted into the luminance mapping relationship in the linear space, and then the luminance mapping relationship in the linear space is converted into a non-linear space in which a saturation processing input signal is located, to obtain the saturation mapping relationship.

In a possible implementation, the performing saturation processing on an original input signal in a first space based on a saturation mapping relationship, to obtain a saturation processing output signal includes: obtaining a saturation mapping coefficient based on the luminance value of the original input signal and the saturation mapping relationship; adjusting the chrominance component of the original input signal based on the saturation mapping coefficient, to obtain an adjusted chrominance component; and obtaining the saturation processing output signal based on the luminance value of the original input signal and the adjusted chrominance component.

A specific saturation processing manner is provided in this embodiment of this application. The saturation mapping coefficient is obtained based on the luminance value of the original input signal and the saturation mapping relationship, and then, the chrominance component of the original input signal is adjusted based on the saturation mapping coefficient, to obtain the adjusted chrominance component, and the saturation processing output signal is obtained with reference to the luminance value of the original input signal. Saturation processing and luminance processing are combined, so that color accuracy of the target output signal is improved, distortion of an output video picture is reduced, and user experience is improved.

In a possible implementation, the chrominance component includes a first chrominance component and a second chrominance component. The adjusting the chrominance component of the original input signal based on the saturation mapping coefficient includes; determining a first saturation adjustment factor based on a first gain coefficient and the saturation mapping coefficient; determining a second saturation adjustment factor based on a second gain coefficient and the saturation mapping coefficient; adjusting the first chrominance component based on the first saturation adjustment factor; and adjusting the second chrominance component based on the second saturation adjustment factor.

In this embodiment of this application, the original input signal and the saturation processing output signal each include two chrominance components, and the two chrominance components are separately adjusted based on the saturation mapping coefficient to implement saturation processing, so that color accuracy of the target output signal is improved, distortion of an output video picture is reduced, and user experience is improved.

In a possible implementation, the performing luminance processing and color gamut processing on the first input signal in the second space, to obtain a target output signal includes: determining, based on the luminance mapping relationship, a luminance value that is obtained after the luminance mapping and that corresponds to a luminance value of the first input signal; obtaining a luminance-mapped signal based on a luminance value gain and the first input signal, where the luminance value gain is a ratio of the luminance value obtained after the luminance mapping to the luminance value of the first input signal; and converting the luminance-mapped signal into a color gamut in which the target output signal is located, to obtain the target output signal.

In this embodiment of this application, luminance processing may be first performed on the first input signal in the second space, and then, color gamut processing is performed on the luminance-processed signal to obtain the target output signal.

In a possible implementation, the performing luminance processing and color gamut processing on the first input signal in the second space, to obtain a target output signal includes: converting the first input signal into a color gamut in which the target output signal is located, to obtain a luminance processing input signal; determining, based on the luminance mapping relationship, a luminance value that is obtained after the luminance mapping and that corresponds to a luminance value of the luminance processing input signal, and obtaining a luminance-mapped signal based on a luminance value gain and the luminance processing input signal, and using the luminance-mapped signal as the target output signal, where the luminance value gain is a ratio of the luminance value obtained after the luminance mapping to the luminance value of the luminance processing input signal.

In this embodiment of this application, color gamut processing may be first performed on the original input signal in the second space, and then, luminance processing is performed on a color gamut-processed signal to obtain the target output signal.

In a possible implementation, after the obtaining a luminance-mapped signal based on a luminance value gain and the luminance processing input signal, the method further includes: converting the luminance-mapped signal into a space in which the target output signal is located, to obtain the target output signal.

In a possible implementation, the original input signal is a HDR signal, and the target output signal is a SDR signal.

In this embodiment of this application, the HDR signal may be converted into the SDR signal, so that the HDR signal can be correctly played on a display device that supports the SDR signal.

In a possible implementation, the original input signal is a HDR HLG signal of a hybrid log-gamma curve, or the original input signal is a HDR PQ signal of a perceptual quantizer curve.

In this embodiment of this application, the HDR HLG signal may be converted into the HDR PQ signal, so that the HDR HLG signal can be correctly played on a display device that supports the HDR PQ signal.

In a possible implementation, the original input signal is a SDR signal, and the target output signal is a HDR signal.

In this embodiment of this application, the SDR signal may be converted into the HDR signal, so that the SDR signal can be correctly played on a display device that supports the HDR signal.

According to a seventh aspect, an embodiment of this application provides a video signal processing method, including: obtaining a format of an original input signal and a format of a target output signal; determining, based on the format of the original input signal and the formal of the target output signal, to perform at least one of the following processing on the original input signal: color gamut processing, luminance processing, and saturation processing, and determining a processing sequence of the at least one processing; and performing the at least one processing on the original input signal based on the processing sequence, to obtain the target output signal.

In this embodiment of this application, the at least one processing performed on the original input signal and the processing sequence may be determined based on the format of the original input signal and the format of the target output signal, so that the signal processing method provided in this embodiment of this application is applicable to various signal conversion scenarios.

In a possible implementation, the original input signal is a HDR signal, and the target output signal is a SDR signal. The at least one processing is color gamut processing, luminance processing, and saturation processing.

This embodiment of this application may be applicable to a scenario in which the HDR signal is converted into the SDR signal. When the HDR signal is converted into the SDR signal, color gamut processing, luminance processing, and saturation processing need to be performed on the original input signal.

In a possible implementation, the processing sequence is luminance processing, color gamut processing, and saturation processing. The performing the at least one processing on the original input signal based on the processing sequence, to obtain the target output signal includes: converting the original input signal into a first linear RGB signal; performing luminance processing on the first linear RGB signal to generate a second linear RGB signal, performing color gamut processing on the second linear RGB signal to generate a third linear RGB signal; converting the third linear RGB signal into a saturation processing input signal; and performing saturation processing on the saturation processing input signal to generate the target output signal.

This embodiment of this application provides a processing sequence for converting the HDR signal into the SDR signal and specific processing steps, so that the HDR signal can be correctly displayed on a display device that supports the SDR signal.

In a possible implementation, the processing sequence is color gamut processing, luminance processing, and saturation processing. The performing the at least one processing on the original input signal based on the processing sequence, to obtain the target output signal includes, converting the original input signal into a first linear RGB signal; performing color gamut processing on the first linear RGB signal to generate a second linear RGB signal; performing luminance processing on the second linear RGB signal to generate a third linear RGB signal, converting the third linear RGB signal into a saturation processing input signal, and performing saturation processing on the saturation processing input signal to generate the target output signal.

This embodiment of this application provides another processing sequence for converting the HDR signal into the SDR signal and specific processing steps, so that the HDR signal can be correctly displayed on a display device that supports the SDR signal.

In a possible implementation, the processing sequence is saturation processing, luminance processing, and color gamut processing. The performing the at least one processing on the original input signal based on the processing sequence, to obtain the target output signal includes: performing saturation processing on the original input signal to generate a saturation processing output signal; converting the saturation processing output signal into a first linear RGB signal; performing luminance processing on the first linear RGB signal to generate a second linear RGB signal; performing color gamut processing on the second linear RGB signal to generate a third linear RGB signal; and converting the third linear RGB signal into the target output signal.

This embodiment of this application provides another processing sequence for converting the HDR signal into the SDR signal and specific processing steps, so that the HDR signal can be correctly displayed on a display device that supports the SDR signal.

In a possible implementation, the processing sequence is saturation processing, color gamut processing, and luminance processing. The performing the at least one processing on the original input signal based on the processing sequence, to obtain the target output signal includes: performing saturation processing on the original input signal to generate a saturation processing output signal; converting the saturation processing output signal into a first linear RGB signal; performing color gamut processing on the first linear RGB signal to generate a second linear RGB signal; performing luminance processing on the second linear RGB signal to generate a third linear RGB signal; and converting the third linear RGB signal into the target output signal.

This embodiment of this application provides another processing sequence for converting the HDR signal into the SDR signal and specific processing steps, so that the HDR signal can be correctly displayed on a display device that supports the SDR signal.

In a possible implementation, the original input signal is a SDR signal, and the target output signal is a HDR signal. The at least one processing is color gamut processing and luminance processing. The processing sequence is color gamut processing and luminance processing. The performing the at least one processing on the original input signal based on the processing sequence, to obtain the target output signal includes: converting the original input signal into a first linear RGB signal; performing color gamut processing on the first linear RGB signal to generate a second linear RGB signal, performing luminance processing on the second linear RGB signal to generate a third linear RGB signal; and converting the third linear RGB signal into the target output signal.

This embodiment of this application may be applicable to a scenario in which the SDR signal is converted into the HDR signal. When the SDR signal is converted into the HDR signal, color gamut processing and luminance processing need to be performed on the original input signal. This embodiment of this application further provides a processing sequence for converting the SDR signal into the HDR signal and specific processing steps, so that the SDR signal can be correctly displayed on a display device that supports the HDR signal.

In a possible implementation, the original input signal is a SDR signal, and the target output signal is a HDR signal. The at least one processing is color gamut processing and luminance processing. The processing sequence is luminance processing and color gamut processing. The performing the at least one processing on the original input signal based on the processing sequence, to obtain the target output signal includes: converting the original input signal into a first linear RGB signal; performing luminance processing on the first linear RGB signal to generate a second linear RGB signal; performing color gamut processing on the second linear RGB signal to generate a third linear RGB signal; and converting the third linear RGB signal into the target output signal.

This embodiment of this application may be applicable to a scenario in which the SDR signal is converted into the HDR signal. When the SDR signal is converted into the HDR signal, color gamut processing and luminance processing need to be performed on the original input signal. This embodiment of this application further provides another processing sequence for converting the SDR signal into the HDR signal and specific processing steps, so that the SDR signal can be correctly displayed on a display device that supports the HDR signal.

In a possible implementation, the original input signal is a HDR HLG signal of a hybrid log-gamma curve, and the target output signal is a HDR PQ signal of a perceptual quantizer curve. The at least one processing is luminance processing. The performing the at least one processing on the original input signal based on the processing sequence, to obtain the target output signal includes, converting the original input signal into a first linear RGB signal; performing luminance processing on the first linear RGB signal to generate a second linear RGB signal; and converting the second linear RGB signal into the target output signal.

This embodiment of this application may be applicable to a scenario in which the HDR HLG signal is converted into the HDR PQ signal. When the HDR HLG signal is converted into the HDR PQ signal, luminance processing needs to be performed on the original input signal, so that the HDR HLG signal can be correctly displayed on a display device that supports the HDR PQ signal.

In a possible implementation, the original input signal is a SDR signal, the target output signal is a SDR signal, the original input signal belongs to a first color gamut range, and the target output signal belongs to a second color gamut range. The at least one processing is color gamut processing. The performing the at least one processing on the original input signal based on the processing sequence, to obtain the target output signal includes: converting the original input signal into a first linear RGB signal; performing color gamut processing on the first linear RGB signal to generate a second linear RGB signal; and converting the second linear RGB signal into the target output signal.

This embodiment of this application may be applicable to a scenario in which SDR signals belonging to different color gamuts are converted into SDR signals. Color gamut processing needs to be performed on the original input signal, so that the original input signal can be correctly displayed on a display device.

According to an eighth aspect, an embodiment of this application provides a video signal processing apparatus, including: a color space conversion unit, configured to perform color space conversion on a to-be-processed video signal to obtain a first non-linear RGB signal; an electro-optical transfer unit, configured to convert the first non-linear RGB signal based on an electro-optical transfer function, to obtain a first linear RGB signal; a luminance mapping unit, configured to perform luminance mapping on the first linear RGB signal to obtain a second linear RGB signal, where a luminance value range corresponding to the second linear RGB signal is the same as a luminance value range corresponding to a display device; a color gamut conversion unit, configured to perform color gamut conversion on the second linear RGB signal to obtain a third linear RGB signal, where a color gamut corresponding to the third linear RGB signal is the same as a color gamut corresponding to the display device; an optical-electro transfer unit, configured to convert the third linear RGB signal to obtain a second non-linear RGB signal; the color space conversion unit is further configured to perform color space conversion on the second non-linear RGB signal to obtain a first luminance-chrominance signal; and a saturation mapping unit, configured to perform saturation mapping on a chrominance component of the first luminance-chrominance signal to obtain a second luminance-chrominance signal.

In a possible implementation, the to-be-processed video signal is a HDR signal, and the second luminance-chrominance signal is a SDR signal.

In a possible implementation, the luminance mapping unit is specifically configured to: calculate a temporary luminance value based on each primary color value of the first linear RGB signal; convert the temporary luminance value based on a preset luminance mapping curve, to obtain an adjustment coefficient; and multiply each primary color value by the adjustment coefficient to obtain the third linear RGB signal.

In a possible implementation, the temporary luminance value is calculated according to the following formula.

$$Y=C_1 \times R+C_2 \times G+C_3 \times B, \text{ where}$$

Y is the temporary luminance value, R, G, and B are respectively primary color values of the first linear RGB signal, $C_1=0.2627$, $C_2=0.678$, and $C_3=0.0593$.

In a possible implementation, the converting the temporary luminance value based on a preset luminance mapping curve, to obtain an adjustment coefficient includes: determining, by using a first mapping relationship table, the adjustment coefficient corresponding to the temporary luminance value, where the first mapping relationship table is used to store a horizontal coordinate value and a vertical coordinate value of at least one sampling point on the luminance mapping curve.

In a possible implementation, the saturation mapping unit is specifically configured to: convert the temporary luminance value based on a preset saturation mapping curve, to obtain a saturation factor; and multiply a product of the saturation factor and a preset chrominance adjustment factor by a chrominance value of the chrominance component, to obtain an adjusted chrominance value.

In a possible implementation, the converting the temporary luminance value based on a preset saturation mapping curve includes: determining, by using a second mapping relationship table, the saturation factor corresponding to the temporary luminance value, where the second mapping relationship table is used to store a horizontal coordinate value and a vertical coordinate value of at least one sampling point on the saturation mapping curve.

In a possible implementation, a color format of the first luminance-chrominance signal includes a YUV format or a YCbCr format and another luminance-chrominance (YCC) color space format.

According to a ninth aspect, an embodiment of this application provides a video signal processing apparatus, including, a saturation mapping unit, configured to perform saturation mapping on a chrominance component of a to-be-processed video signal to obtain a first luminance-chrominance signal; a color space conversion unit, configured to perform color space conversion on the first luminance-chrominance signal to obtain a first non-linear RGB signal; an electro-optical transfer unit, configured to convert the first non-linear RGB signal based on an electro-optical transfer function, to obtain a first linear RGB signal; a luminance mapping unit, configured to perform luminance mapping on the first linear RGB signal to obtain a second linear RGB signal, where a luminance value range corresponding to the second linear RGB signal is the same as a luminance value range corresponding to a display device; a color gamut conversion unit, configured to perform color gamut conversion on the second linear RGB signal to obtain a third linear RGB signal, where a color gamut corresponding to the third linear RGB signal is the same as a color gamut corresponding to the display device, an optical-electro transfer unit, configured to convert the third linear RGB signal based on an optical-electro transfer function, to obtain a second non-linear RGB signal; and the color space conversion unit is further configured to perform color space conversion on the second non-linear RGB signal to obtain a second luminance-chrominance signal.

In a possible implementation, the to-be-processed video signal is a HDR signal, and the second luminance-chrominance signal is a SDR signal.

In a possible implementation, the saturation mapping unit is specifically configured to: convert a luminance component of the to-be-processed video signal based on a preset saturation mapping curve, to obtain a saturation factor; and multiply a product of the saturation factor and a preset chrominance adjustment factor by a chrominance value of the chrominance component, to obtain an adjusted chrominance value.

In a possible implementation, the converting a luminance component of the to-be-processed video signal based on a preset saturation mapping curve includes, determining, by using a first mapping relationship table, the saturation factor corresponding to the luminance component of the to-be-processed video signal, where the first mapping relationship table is used to store a horizontal coordinate value and a vertical coordinate value of at least one sampling point on the saturation mapping curve.

In a possible implementation, the luminance mapping unit is specifically configured to: calculate a temporary luminance value based on each primary color value of the first linear RGB signal; and convert the temporary luminance value based on a preset luminance mapping curve, to obtain an adjustment coefficient. A second obtaining subunit is configured to multiply each primary color value by the adjustment coefficient to obtain the second linear RGB signal.

In a possible implementation, the temporary luminance value is calculated according to the following formula:

$$Y=C_1 \times R+C_2 \times G+C_3 \times B, \text{ where}$$

Y is the temporary luminance value, R, G, and B are respectively primary color values of the first linear RGB signal, $C_1=0.2627$, $C_2=0.678$, and $C_3=0.0593$.

In a possible implementation, the converting the temporary luminance value based on a preset luminance mapping curve includes, determining, by using a second mapping relationship table, the adjustment coefficient corresponding to the temporary luminance value, where the second mapping relationship table is used to store a horizontal coordinate value and a vertical coordinate value of at least one sampling point on the luminance mapping curve.

In a possible implementation, a color format of the first luminance-chrominance signal includes a YUV format or a YCbCr format and another luminance-chrominance (YCC) color space format.

According to a tenth aspect, an embodiment of this application provides a video signal processing apparatus, including: a conversion unit, configured to perform color space conversion and non-linear space-to-linear space conversion on a to-be-processed video signal to obtain a first linear RGB signal; a luminance mapping unit, configured to convert the first linear RGB signal into a second linear RGB signal through luminance mapping; an optical-electro transfer unit, configured to convert the second linear RGB signal into a non-linear RGB signal based on an optical-electro transfer function; and a color space conversion unit, configured to perform color space conversion on the non-linear RGB signal to obtain a processed video signal, where a signal format of the processed video signal adapts to a display device. In a possible implementation, the to-be-processed video signal is a hybrid log-gamma HLG signal, and the processed video signal is a perceptual quantizer (PQ) signal.

In a possible implementation, the non-linear space-to-linear space conversion is an inverse process of HLG optical-electro transfer.

In a possible implementation, the luminance mapping unit is specifically configured to: calculate a scene luminance value based on each primary color value of the first linear RGB signal; adjust the scene luminance value based on a rated display luminance peak value and a system gamma value of the display device, to obtain a display luminance value; and multiply each primary color value by a ratio of the display luminance value to the scene luminance value, to obtain the second linear RGB signal.

In a possible implementation, the display luminance value is obtained according to the following formula:

$Y_d = Y_s^\gamma * L_W$, where $Y_d$ is the display luminance value, $Y_s$ is the scene luminance value, $L_W$ is the rated display luminance peak value, $\gamma$ is the system gamma value, and $\gamma=1.2+0.42*\log_{10}(L_W/1000)$.

According to an eleventh aspect, an embodiment of this application provides a playing device, including:

a memory, configured to store a program instruction; and a processor, configured to: invoke the program instruction in the memory, and execute the program instruction to perform the video signal processing method provided in the first to the seventh aspects of the embodiments of this application or any implementation of the first to the seventh aspects.

According to a twelfth aspect, an embodiment of this application provides a computer-readable storage medium. The computer-readable storage medium stores a program instruction. When the program instruction is run on a computer or a processor, the computer or the processor is enabled to perform the video signal processing method provided in the first to the seventh aspects of the embodiments of this application or any implementation of the first to the seventh aspects.

According to a thirteenth aspect, an embodiment of this application provides a computer program product including an instruction, and when the instruction is run on a computer or a processor, the computer or the processor is enabled to perform the video signal processing method provided in the first to the seventh aspects or any implementation of the first to the seventh aspects.

DESCRIPTION OF EMBODIMENTS

Figure 1:
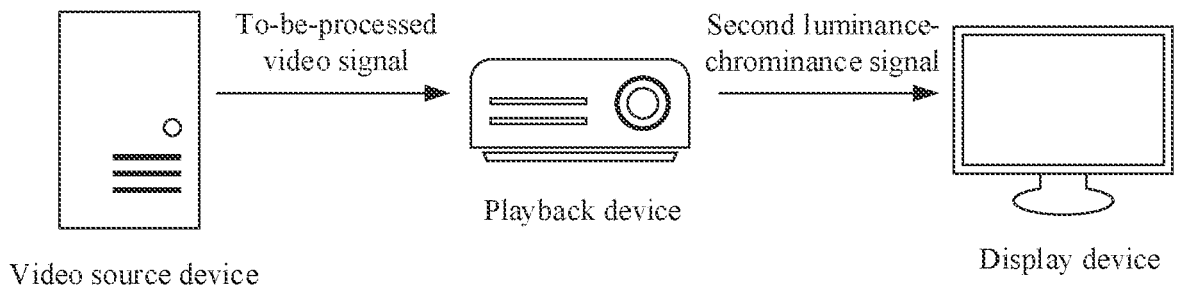
FIG. 1 is an architectural diagram of an example video signal processing system according to an embodiment of this application.

It should be understood that, in this application, "at least one" means one or more, and "a plurality of" means two or more. "And/or" is used to describe an association relationship of associated objects, and indicates that three relationships may exist. For example, "A and/or B" may indicate three cases: only A exists, only B exists, and both A and B exist, where A and B may be singular or plural numbers. The character "/" generally indicates an "or" relationship between the associated objects. "At least one of the following items" or a similar expression means any combination of these items, including any combination of a single item or a plurality of items. For example, at least one of a, b, or c may represent a, b, c, "a and b", "a and c", "b and c", or "a, b, and c", where a, b, and c may be a single one, or may be a plurality of.

First, to facilitate understanding of the embodiments of this application, some concepts or terms in the embodiments of this application are explained.

A primary color value is a value corresponding to a specific image color component (for example, R, G, B, or Y).

A digital code value is a digital expression value of an image signal, and the digital code value is used to represent a non-linear primary color value.

A linear primary color value is a linear primary color value that is directly proportional to light intensity. In an optional case, the linear primary color value needs to be normalized to [0, 1], and is referred to as E for short.

A non-linear primary color value is a non-linear primary color value, is a normalized digital expression value of image information, and is directly proportional to a digital code value. In an optional case, the non-linear primary color value needs to be normalized to [0, 1], and is referred to as E' for short.

An electro-optical transfer function (EOTF) is a conversion relationship from a non-linear primary color value to a linear primary color value.

An optical-electro transfer function (OETF) is a conversion relationship from a linear primary color value to a non-linear primary color value.

Metadata is data that is carried in a video signal and that describes video source information.

Dynamic metadata is metadata associated with each frame of image, and the metadata varies with a picture.

Static metadata is metadata associated with an image sequence, and the static metadata remains unchanged in the image sequence.

A luminance signal (luma) is a combination of non-linear primary color signals, and a symbol is Y'.

Luminance mapping is mapping of luminance of a source image to luminance of a target system.

A color volume is a volume constituted by chrominance and luminance that can be presented by a display in a chrominance space.

Display adaptation is processing performed on a video signal to adapt to a display characteristic of a target display.

A source image is an image input in an HDR pre-processing stage.

A mastering display is a reference display that is used when a video signal is being edited and produced, and is used to determine a video edition and production effect.

A linear scene light signal is an HDR video signal that uses content as scene light in an HDR video technology, is scene light captured by a camera/camera sensor, and is usually a relative value. After HLG coding is performed on the linear scene light signal, an HLG signal is obtained. The HLG signal is a scene light signal, and the HLG signal is non-linear. The scene light signal usually needs to be converted into a display light signal through OOTF before being displayed on a display device.

A linear display light signal is an HDR video signal that uses content as display light in an HDR video technology-, is display light emitted from a display device, and is usually an absolute value in units of nits. After PQ coding is performed on the linear display light signal, a PQ signal is obtained. The PQ signal is a display light signal, and the PQ signal is a non-linear signal. The display light signal is usually displayed on the display device based on absolute luminance of the display light signal.

An optical-optical transfer function (OOTF) is a curve for converting an optical signal into another optical signal in a video technology-.

A dynamic range is a ratio of maximum luminance to minimum luminance in a video signal.

Luma-Chroma-Chroma means luminance-chrominance-chrominance, and is three components of a video signal whose luminance and chrominance are separated.

Perceptual quantizer (PQ) is an HDR standard, and is also an HDR conversion equation, and the PQ is determined based on a visual capability of a person. A video signal displayed by the display device is usually a video signal in a PQ coding format.

PQ EOTF curve: A PQ-coded electrical signal is converted into a linear optical signal that is in units of nits. A conversion formula is:

$$\text{PQ\_EOTF}(E') = 10000 \left( \frac{\max\left[(E'^{1/m_2} - c_1), 0\right]}{c_2 - c_3 E'^{1/m_2}} \right)^{1/m_1}, \quad (1)$$

where

E' is an input electrical signal whose value range is [0,1], and fixed parameter values are as follows:
m1=2610/16384=0.1593017578125;
m2=2523/4096*128=78.84375;
c1=3424/4096=0.8359375=c3−c2+1;
c2=2413/4096*32=18.8515625; and
c3=2392/4096*32=18.6875.

A PQ EOTF$^{-1}$ curve is an inverse curve of PQ EOTF. A physical meaning is to convert a linear optical signal of [0,10000] nits into a PQ-coded electrical signal. A conversion formula is:

$$\text{PQ\_EOTF}^{-1}(E) = \left( \frac{c_1 + c_2(E/10000)^{m_1}}{1 + c_3(E/10000)^{m_1}} \right)^{m_2} \quad (2)$$

A color gamut is a range of colors included by a specific color space. Related color gamut standards include BT.709 and BT.2020.

Hybrid log-gamma (HLG) is an HBR standard in which a video signal or an image signal collected by a camera, a video camera, an image sensor, or another type of image collection device is a video signal in an HLG coding format.

An HLG OETF curve is a curve for performing HLG coding on a linear scene light signal to convert the linear scene light signal into a non-linear electrical signal. A conversion formula is as follows:

$$E' = \begin{cases} \sqrt{3*E} & 0 \le E \le 1/12 \\ a*\ln(12*E - b) + c & 1/12 < E \le 1 \end{cases} \quad (3)$$

E is an input linear scene light signal with a range of [0, 1], and E' is an output non-linear electrical signal with a range of [0,1]; and fixed parameters are: a=0.17883277, b=0.28466892, and c=0.55991073.

An HLG OETF$^{-1}$ curve is an inverse curve of HLG OETF. An HLG-coded non-linear electrical signal is converted into a linear scene light signal. A conversion formula is as follows:

$$E = \begin{cases} E'^2/3, & 0 \le E' \le 1/2 \\ \left(\exp\left(\frac{(E'-c)}{a}\right)+b\right)/12, & 1/2 < E' \le 1 \end{cases} \quad (4)$$

Linear space: In this application, the linear space means a space in linear optical signal is located.

Non-linear space: In this application, the non-linear space is a space in which a linear optical signal is located after being converted by using a non-linear curve. Common non-linear curves of HBR include a PQ EOTF$^{-1}$ curve, an HLG OETF curve, and the like. A common non-linear curve of SBR includes a gamma curve. It is generally considered that a linear optical signal is visually linear to a human eye after being coded by using the non-linear curve. It should be understood that the non-linear space may be considered as a visually linear space.

Gamma correction: Gamma correction is a method for performing non-linear tone editing on an image, and a dark part and a light part in an image signal may be detected, and a proportion of the dark part and the light part is increased, to improve an image contrast effect. Optical-electro transfer characteristics of a current display screen, a photographic film, and many electronic cameras may be non-linear. A relationship between output and input of these non-linear components may be represented by a power function. To be specific, Output=(Input)$^\gamma$.

Non-linear conversion is performed on a color value output by a device because a human visual system is not linear, and a human perceives a visual stimulus through comparison. When an outside world strengthens the stimulus in a specific proportion, the stimulus increases evenly for the human. Therefore, for human perception, a physical quantity increased by a geometric progression is uniform. To display an input color based on a human visual rule, a linear color value needs to be converted into a non-linear color value through the foregoing non-linear conversion in a power function form. A value $\gamma$ of gamma may be determined based on an optical-electro transfer curve of the color space.

Color Space: A color may be different perception of an eye for light of different frequencies, or may represent objectively present light of different frequencies. The color space is a color range defined by a coordinate system established by a human to represent a color. A color gamut defines one color space together with a color model. The color model is an abstract mathematical model that represents a color by using a group of color components. The color model may include, for example, a red green blue (RGB) mode and a cyan magenta yellow key plate (CMYK) mode. The color gamut is a sum of colors that can be generated by a system. For example, Adobe RGB and sRGB are two different color spaces based on an RGB model.

Each device, such as a display or a printer, has a color space and can generate only a color in a color gamut of the device. When moving an image from one device to another device, a color of the image may change on different devices because each device converts and display s RGB or CMYK based on a color space of the device.

Several types of common color space are described below.

An sRGB color space (standard Red Green Blue color space) is a standard RGB color space developed by HP and Microsoft in 1996 for a display, a printer, and the internet. The sRGB color space provides a standard method for defining a color, so that a variety of external devices such as a display, a printer, and a scanner of a computer have a common language for the color with application software. The sRGB color space is based on independent color coordinates, so that the color corresponds to a same color coordinate system when used and transmitted by different devices without being affected by respective different color coordinates of these devices. However, a color gamut space of an sRGB is relatively small. Three primary colors red, green, and blue are defined in sRGB. A color value of one of the three primary colors is a maximum value, and a color corresponding to a case in which both color values of the other two colors are zero represents the color. For example, in the three primary colors red, green, and blue, values of color values R, G, and B are all 0 to 255. In this case, when both values of R and G are zero, a color corresponding to a case in which B is 255 represents blue.

A YCC color space in this application represents a color space in which luminance and chrominance are separated, and three components YCC respectively represent luminance-chrominance-chrominance. Common YCC space video signals include YUV, YCbCr, ICtCp, and the like.

It should be understood that different color spaces may be converted between each other.

Reserved bits. "Reserved bits" in a bitstream indicates that some syntax units are reserved for future extension of this part, and these bits need to be ignored during decoding processing. "Reserved bits" should not have more than 21 consecutive '0's from any byte alignment position.

A marker bit indicates that a value of this bit needs to be '1'.

The following clearly and completely describes the technical solutions in the embodiments of this application with reference to the accompanying drawings in the embodiments of this application.

FIG. 1 is an architectural diagram of a video signal processing system according to an embodiment of this application. As shown in FIG. 1, the video signal processing system includes a video source device, a playing device, and a display device. The playing device receives a second signal sent by the video source device, and after converting a to-be-processed video signal into a second luminance-chrominance signal, the playing device sends the second luminance-chrominance signal to the display device. A format of the to-be-processed video signal is different from a format of the second luminance-chrominance signal. The format of the second luminance-chrominance signal matches a format supported by the display dev ice.

When establishing a connection to the display device by using an HDMI interface, the playing device can learn a video format that can be supported by the display device. The display device can support a plurality of video formats. When the format of the to-be-processed video signal is not the video format that can be supported by the display device, the playing device needs to convert the format of the to-be-processed video signal into the format that can be supported by the display device.

For example, the video format supported by the display dev ice is a video format of an SDR type, the to-be-processed video signal received by the playing device is a video format of an HDR type, and the display device cannot display the video format of the HDR type. For another example, video formats supported by the display device are a BT.601 video format and a BT.709 video format of an SDR type, and the format of the to-be-processed video signal received by the playing device is a BT.2020 video format of the SDR type. If the format of the to-be-processed video signal received by the playing device does not match the format supported by the display-device, to display a video received by the playing device, the video needs to be converted from a video format that is not supported by the display device into the video format supported by the display device. One video format supported by the display device is selected, and the to-be-processed video signal is converted from the video format that is not supported by the display device into the video format supported by the display device.

It should be noted herein that the technical solutions provided in this application are not only applicable to conversion of a video between video formats of different types, for example, conversion between the video format of the SDR type and the video format of the HDR type, but are also applicable to conversion of the video between different subdivided video formats of a same type, for example, conversion between an HDR PQ video format and an HDR HLG video format in the video format of the HDR type.

The playing device in this application is a playing device that has an HDMI interface and that can interact with the display device by using the HDMI interface, for example, a set top box, a Blu-ray disk drive, a computer, or a mobile phone. The display device in this application may be a television set, a projector, a computer display, or the like.

In addition, the technical solutions provided in this application may be further applicable to a scenario in which a video file is played locally. When a format of a local video file does not match the format supported by the display device, the display device may directly convert a video signal inside a chip of the display device. In this case, the chip may be considered as a playing device, the playing device is located inside the display device, and the source device may be a dev ice for storing the local video file. For example, the television set may play the video file locally, and this video signal may be converted inside a chip of the television set.

The signal format mentioned in this embodiment of this application is a type, a color gamut, luminance, or the like of a signal. Based on a video signal type, there may be an SDR signal and an HDR signal. If a signal is an HDR signal, the signal format may be alternatively an HLG signal coded by using a hybrid log-gamma method or a PQ signal coded by using a perceptual quantizer method. Based on a color gamut of a signal, there may be BT.709, BT.2020, and the like. Based on signal luminance, there may be signals belonging to different luminance ranges, and the luminance ranges may be, for example, but are not limited to [0, 100] nits, [0, 1000] nits, and [0, 400] nits.

The to-be-processed video signal and the second luminance-chrominance signal mentioned in this embodiment of this application may be YCbCr signals or YUV signals, or may be signals in another YCC color space family. In the following embodiments, a YCbCr signal is used as an example for description.

With reference to the video signal processing system provided in FIG. 1, the following describes a video signal processing method provided in an embodiment of this application.

Figure 2:
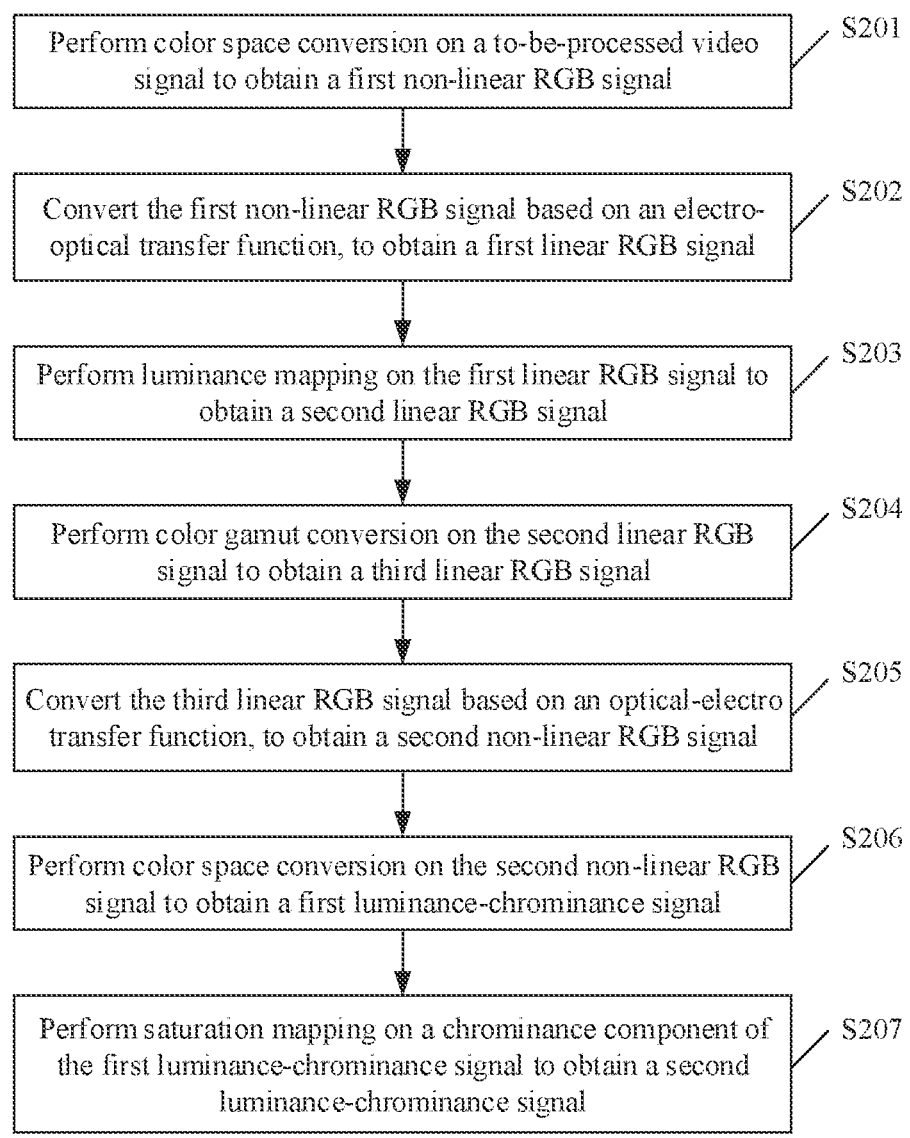
FIG. 2 is a flowchart of an example video signal processing method according to an embodiment of this application.

As shown in FIG. 2, the video signal processing method may include at least the following several steps.

S201: Perform color space conversion on a to-be-processed video signal to obtain a first non-linear RGB signal.

Specifically, the to-be-processed video signal belongs to a YCbCr color space, and the to-be-processed video signal is converted from the YCbCr color space into an RGB color space.

It is assumed that the to-be-processed video signal Y'$_s$Cb$_s$Cr$_s$ is a 4:4:4 YCbCr non-linear video signal that is restored by a playing device through AVS2 decoding and reconstruction and chrominance upsampling, and the first non-linear RGB signal is R'$_s$G'$_s$B'$_s$.

$$\begin{pmatrix} Y_{sf} \\ Cb_{sf} \\ Cr_{sf} \end{pmatrix} = \begin{pmatrix} \frac{1}{876} & 0 & 0 \\ 0 & \frac{1}{896} & 0 \\ 0 & 0 & \frac{1}{896} \end{pmatrix} \times \begin{pmatrix} Y'_s - 64 \\ Cb_s - 512 \\ Cr_s - 512 \end{pmatrix} \quad (5)$$

$$\begin{pmatrix} R'_s \\ G'_s \\ B'_s \end{pmatrix} = \begin{pmatrix} 1 & 0 & 1.4746 \\ 1 & -0.1645 & -0.5713 \\ 1 & 1.8814 & 0 \end{pmatrix} \times \begin{pmatrix} Y_{sf} \\ Cb_{sf} \\ Cr_{sf} \end{pmatrix} \quad (6)$$

The signal Y'$_s$Cb$_s$Cr$_s$ is a digital code value in a 10-bit limited range, and R'$_s$G'$_s$B'$_s$ obtained after such processing is a floating-point non-linear primary color value whose value belongs to [0, 1].

S202: Convert the first non-linear RGB signal based on an electro-optical transfer function, to obtain a first linear RGB signal.

Optionally, if the to-be-processed video signal is an HDR HLG signal, the first non-linear RGB signal is converted into a linear signal by using an HDR curve, and the linear signal obtained after conversion is the first linear RGB signal. That the to-be-processed video signal is an HDR HLG signal is used as an example for description in the following steps.

Specifically, it is assumed that the first linear RGB signal R$_s$G$_s$B$_s$ is obtained after electro-optical transfer is performed on the first non-linear RGB signal R'$_s$G'$_s$B'$_s$. A specific calculation process is as follows:

$$E_S = HLG\_OETF^{-1}(E'_s) \quad (7)$$

E$_s$ represents any component R$_s$, G$_s$, or B$_s$ in the signal R$_s$G$_s$B$_s$, and a value of E$_s$ belongs to [0,1]. E'$_s$ represents a component R'$_s$, G'$_s$, or B'$_s$ that is in the signal R'$_s$G'$_s$B'$_s$ and that corresponds to the component represented by E$_s$. A function HLG_OETF$^{-1}$( ) is defined as follows based on ITU BT.2100:

$$HLG\_OETF^{-1}(E') = \begin{cases} \dfrac{E'^2}{3} & 0 \le E' \le \dfrac{1}{2} \\ \dfrac{\left(\exp\left(\dfrac{(E'-c)}{a}\right)+b\right)}{12} & \dfrac{1}{2} \le E' \le 1 \end{cases} \quad (8)$$

where $a = 0.17883277$, $b = 1 - 4a$, and $c = 0.5 - a*\ln(4a)$.

Optionally, if the to-be-processed video signal is an HDR PQ signal, the first non-linear RGB signal is converted into a linear signal by using a PQ curve, and the linear signal obtained after conversion is the first linear RGB signal. A specific calculation process is similar to that in a case in which the to-be-processed video signal is an HDR HLG signal, and an HLG curve is replaced with the PQ curve. Details are not described herein.

S203: Perform luminance mapping on the first linear RGB signal to obtain a second linear RGB signal, where a luminance value range corresponding to the second linear RGB signal matches a luminance value range corresponding to a display device.

Specifically, S203 may include the following several steps.

S2031: Calculate a temporary luminance value based on each primary color value of the first linear RGB signal.

Specifically, the temporary luminance value is calculated according to the following formula:

$$Y_s = C_1 \times R_s + C_2 \times G_s + C_3 \times B_s \quad (9),\text{ where}$$

$Y_s$ is the temporary luminance value, $R_s$, $G_s$, and $B_s$ are respectively primary color values of the first linear RGB signal $R_s G_s B_s$, $C_1=2627$, $C_2=0.678$, $C_3=0.0593$, and $Y_z$ is a real number whose value belongs to [0, 1].

A calculation manner of the temporary luminance value $Y_s$ in this embodiment of this application is not limited to the foregoing calculation manner, and there may be another calculation manner in an actual implementation process. This is not limited in this embodiment of this application.

S2032: Convert the temporary luminance value based on a preset luminance mapping curve, to obtain an adjustment coefficient.

Specifically, the luminance mapping curve in this embodiment of this application is a luminance mapping curve in a linear space. The luminance mapping curve (TM_Curve) in this embodiment of this application is pre-generated in a signal processing process, and luminance of the to-be-processed video signal is mapped to obtain a display luminance value that matches the display device, to be specific, final display luminance on the display device.

There are a plurality of manners of generating the luminance mapping curve. In this embodiment of this application, the luminance mapping curve is generated by using the following method, and points $(a_0,b_0)$, $(a_1,b_1)$ . . . $(a_n,b_n)$ on the curve may be selected to represent TM_Curve.

$$TM\_Curve = PQ\_EOTF(f_{tm}(PQ\_EOTF^{-1}(Y_s^\gamma * L_w))) \quad (10),\text{ where}$$

display luminance is $Y_d = Y_s^\gamma * L_w$ \quad (11), where $$\gamma = 1.2 + 0.42 \log_{10}\left(\frac{L_w}{1000}\right), \quad (12)$$

where
$Y_s$ represents a luminance value of a luminance processing input signal; and visual linear luminance is $Y_{dPQ} = PQ\_EOTF^{-1}(Y_d)$ \quad (13), where $$PQ\_EOTF^{-1}(E) = \left(\frac{c_1 + c_2\left(\frac{E}{10000}\right)^{m_1}}{1 + c_3\left(\frac{E}{10000}\right)^{m_1}}\right)^{m_1}, \text{ where} \quad (14)$$

Figure 3:
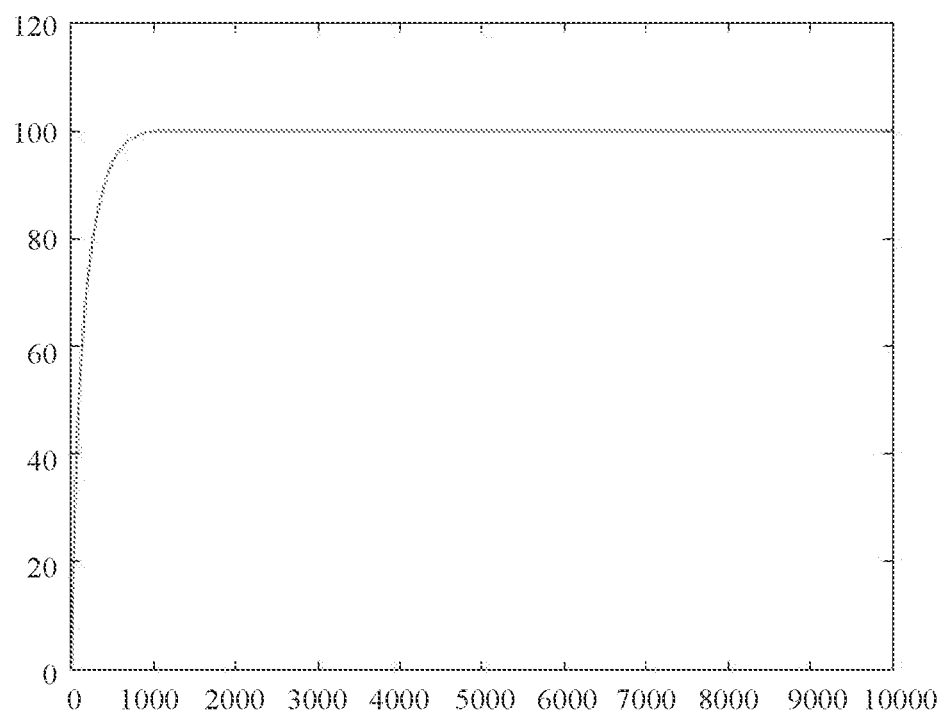
FIG. 3 is a schematic diagram of an example luminance mapping curve according to an embodiment of this application.

$m_1 = 2610/16384 = 0.1593017578125;$ $m_2 = 2523/4096 * 128 = 78.84375;$ $c_1 = 3424/4096 = 0.8359375 = c_3 - c_2 + 1;$ $c_2 = 2413/4096 * 32 = 18.8515625;$ and $c_3 = 2392/4092 * 32 = 18.6875.$ Optionally, a luminance range of the to-be-processed video signal is [0,1000] nits, and a luminance range supported by the display device is [0, 100] nits. FIG. 3 is a schematic diagram of a luminance mapping curve according to an embodiment of this application. A horizontal coordinate represents a luminance value of an input signal that is in units of nits, and a vertical coordinate represents a luminance value of an output signal that is in units of nits.

Luminance mapping is performed to obtain $Y_{tPQ} = f_{tm}(Y_{dPQ})$.

$f_{tm}(\ )$ is defined as follows:

$$f_{tm}(e) = \begin{cases} e & e \leq 0.2643 \\ hmt(e) & 0.2643 < e \leq 0.7518 \\ 0.5079133 & e > 0.7518 \end{cases} \quad (15)$$

A function hmt( ) is defined as follows:

$$hmt(x) = 0.2643 \times \alpha_0(x) + 0.5081 \times \alpha_1(x) + \beta_0(x), \quad (16)$$

$$\text{where } \begin{cases} \alpha_0(x) = \dfrac{(-0.0411 + 2x)(0.7518 - x)^2}{0.1159} \\ \alpha_1(x) = \dfrac{(1.9911 - 2x)(x - 0.2643)^2}{0.1159} \\ \beta_0(x) = \dfrac{(x - 0.2643)(x - 0.7518)^2}{0.2377} \end{cases} \quad (17)$$

Optionally, a luminance range of the to-be-processed video signal is [0, 1000] nits, and a luminance range supported by the display device is [0, 150] nits.

Luminance mapping is performed to obtain $Y_{tPQ} = f_{tm}(Y_{dPQ})$.

$f_{tm}(\ )$ in the equation is defined as follows:

$$f_{tm}(e) = \begin{cases} e, & \text{when } e \leq 0.3468 \\ htm(e), & \text{when } 0.3468 < e \leq 0.7518 \\ 0.549302, & \text{when } e > 0.7518 \end{cases} \quad (18)$$

A function hmt( ) is defined as follows:

$$hmt(x) = 0.3468 \times \alpha_0(x) + 0.5493 \times \alpha_1(x) + \beta_0(x), \quad (19)$$

$$\text{where } \begin{cases} \alpha_0(x) = \dfrac{(-0.2885 + 2x)(0.7518 - x)^2}{0.0665} \\ \alpha_1(x) = \dfrac{(1.9087 - 2x)(x - 0.3468)^2}{0.0665} \\ \beta_0(x) = \dfrac{(x - 0.3468)(x - 0.7518)^2}{0.1641} \end{cases} \quad (20)$$

Optionally, a luminance range of the to-be-processed video signal is [0, 1000] nits, and a luminance range supported by the display device is [0, 200] nits.

Luminance mapping is performed to obtain $Y_{tPQ} = f_{tm}(Y_{dPQ})$.

$f_{tm}(\ )$ in the equation is defined as follows:

$$f_{tm}(e) = \begin{cases} e, & \text{when } e \leq 0.4064 \\ htm(e), & \text{when } 0.4064 < e \leq 0.7518 \\ 0.579133, & \text{when } e > 0.7518 \end{cases} \quad (21)$$

A function hmt( ) is defined as follows:

$$hmt(x) = 0.4064 \times \alpha_0(x) + 0.5791 \times \alpha_1(x) + \beta_0(x), \quad (22)$$

-continued $$\text{where } \begin{cases} \alpha_0(x) = \frac{(-0.4675 + 2x)(0.7518 - x)^2}{0.0412} \\ \alpha_1(x) = \frac{(1.849 - 2x)(x - 0.4064)^2}{0.0412} \\ \beta_0(x) = \frac{(x - 0.4064)(x - 0.7518)^2}{0.1193} \end{cases} \quad (23)$$

Optionally, a luminance range of the to-be-processed video signal is [0, 1000] nits, and a luminance range supported by the display device is [0, 250] nits.

Luminance mapping is performed to obtain $Y_{tPQ}=f_{tm}(Y_{dPQ})$.

$f_{tm}(\ )$ in the equation is defined as follows:

$$f_{tm}(e) = \begin{cases} e, & \text{when } e \leq 0.4533 \\ hmt(e), & \text{when } 0.4533 < e \leq 0.7518 \\ 0.602559, & \text{when } e > 0.7518 \end{cases} \quad (24)$$

A function hmt( ) is defined as follows:

$$hmt(x) = 0.4533 \times \alpha_0(x) + 0.6026 \times \alpha_1(x) + \beta_0(x), \quad (25)$$

$$\text{where } \begin{cases} \alpha_0(x) = \frac{(-0.6080 + 2x)(0.7518 - x)^2}{0.0266} \\ \alpha_1(x) = \frac{(1.8022 - 2x)(x - 0.4533)^2}{0.0266} \\ \beta_0(x) = \frac{(x - 0.4533)(x - 0.7518)^2}{0.0891} \end{cases} \quad (26)$$

Optionally, a luminance range of the to-be-processed video signal is [0, 1000] nits, and a luminance range supported by the display device is [0,300] nits.

Luminance mapping is performed to obtain $Y_{tPQ}f_{tm}=f_{tm}(Y_{dPQ})$.

$f_{tm}(\ )$ in the equation is defined as follows:

$$f_{tm}(e) = \begin{cases} e, & \text{when } e \leq 0.4919 \\ hmt(e), & \text{when } 0.4919 < e \leq 0.7518 \\ 0.621863, & \text{when } e > 0.7518 \end{cases} \quad (27)$$

A function hmt( ) is defined as follows:

$$hmt(x) = 0.4919 \times \alpha_0(x) + 0.6219 \times \alpha_1(x) + \beta_0(x), \quad (28)$$

$$\text{where } \begin{cases} \alpha_0(x) = \frac{(-0.7239 + 2x)(0.7518 - x)^2}{0.0176} \\ \alpha_1(x) = \frac{(1.7636 - 2x)(x - 0.4919)^2}{0.0176} \\ \beta_0(x) = \frac{(x - 0.4919)(x - 0.7518)^2}{0.0676} \end{cases} \quad (29)$$

Optionally, a luminance range of the to-be-processed video signal is [0, 1000] nits, and a luminance range supported by the display device is [0, 350] nits.

Luminance mapping is performed to obtain $Y_{tPQ}=f_{tm}(Y_{dPQ})$.

$f_{tm}(\ )$ in the equation is defined as follows:

$$f_{tm}(e) = \begin{cases} e, & \text{when } e \leq 0.5247 \\ hmt(e), & \text{when } 0.5247 < e \leq 0.7518 \\ 0.638285, & \text{when } e > 0.7518 \end{cases} \quad (30)$$

A function hmt( ) is defined as follows:

$$hmt(x) = 0.5247 \times \alpha_0(x) + 0.6383 \times \alpha_1(x) + \beta_0(x), \quad (31)$$

$$\text{where } \begin{cases} \alpha_0(x) = \frac{(-0.8224 + 2x)(0.7518 - x)^2}{0.0117} \\ \alpha_1(x) = \frac{(1.7307 - 2x)(x - 0.5247)^2}{0.0117} \\ \beta_0(x) = \frac{(x - 0.5247)(x - 0.7518)^2}{0.0516} \end{cases} \quad (32)$$

Optionally, a luminance range of the to-be-processed video signal is [0, 1000] nits, and a luminance range supported by the display device is [0, 400] nits.

Luminance mapping is performed to obtain $Y_{tPQ}=f_{tm}(Y_{dPQ})$.

$f_{tm}(\ )$ in the equation is defined as follows:

$$f_{tm}(e) = \begin{cases} e, & \text{when } e \leq 0.5533 \\ hmt(e), & \text{when } 0.5533 < e \leq 0.7518 \\ 0.652579, & \text{when } e > 0.7518 \end{cases} \quad (33)$$

A function hmt( ) is defined as follows:

$$hmt(x) = 0.5533 \times \alpha_0(x) + 0.6526 \times \alpha_1(x) + \beta_0(x), \text{ where} \quad (34)$$

$$\begin{cases} \alpha_0(x) = \frac{(-0.9082 + 2x)(0.7518 - x)^2}{0.0078} \\ \alpha_1(x) = \frac{(1.7022 - 2x)(x - 0.5533)^2}{0.0078} \\ \beta_0(x) = \frac{(x - 0.5533)(x - 0.7518)^2}{0.0394} \end{cases}$$

A normalized luminance-mapped luminance value is
$$Y_t = PQ\_EOTF(Y_{tPQ}) \quad (35).$$
where $$PQ\_EOTF(E') = 10000 \times \left( \frac{\max[(E'^{1/m_2} - c_1), 0]}{c_2 - c_3 E'^{1/m_2}} \right)^{1/m_1} \quad (36)$$

Therefore, a calculation formula of $Y_t$ is:
$$Y_t = PQ\_EOTF(f_{tm}(PQ\_EOTF)^{-1}(Y_s^\gamma * L_w))) \quad (37), \text{ where}$$

$Y_t$ is a real number, and a value range of $Y_t$ is consistent with the luminance range supported by the display device.

In this embodiment, maximum luminance of the input signal is set as follows: $L_w=1000$ nits. Certainly, $L_w$ may be alternatively set to another value, and this is specifically determined by a luminance range of the input signal.

It may be learned that a method for generating the luminance mapping curve provided in this embodiment of this application is merely an example for description. In an actual implementation process, there is another method, and the method for generating the luminance mapping curve is not limited in this embodiment of this application.

Specifically, the temporary luminance value $Y_s$ is converted based on the luminance mapping curve, to obtain a luminance value $Y_t$ obtained after luminance mapping. A ratio of the luminance value obtained after the luminance mapping to the temporary luminance value is the adjustment coefficient. A specific calculation formula is as follows:

$$TmGain = \begin{cases} \dfrac{Y_t}{Y_s} & Y_s \neq 0 \\ 0 & Y_s = 0 \end{cases} \quad (38)$$

where $Y_t$ is the luminance value that is obtained after the luminance mapping and that is determined based on the luminance mapping curve, to be specific, a vertical coordinate value of the luminance mapping curve.

Specifically, the luminance value $Y_t$ that is obtained after the luminance mapping and that corresponds to the temporary luminance value may be determined by using a first mapping relationship table, and the adjustment coefficient corresponding to the temporary luminance value $Y_s$ is further determined based on the ratio of the luminance value $Y_t$ obtained after the luminance mapping to the temporary luminance value $Y_s$. The first mapping relationship table is used to store a horizontal coordinate value and a vertical coordinate value of at least one sampling point on the luminance mapping curve.

S2033: Multiply each primary color value by the adjustment coefficient to obtain the second linear RGB signal.

Specifically, the second linear RGB signal is marked as $R_{tm}G_{tm}B_{tm}$. A specific calculation process is as follows:

$$\begin{pmatrix} R_{tm} \\ G_{tm} \\ B_{tm} \end{pmatrix} = \begin{pmatrix} TmGain & 0 & 0 \\ 0 & TmGain & 0 \\ 0 & 0 & TmGain \end{pmatrix} \times \begin{pmatrix} R_s \\ G_s \\ B_s \end{pmatrix} \quad (39)$$

S204: Perform color gamut conversion on the second linear RGB signal to obtain a third linear RGB signal, where a color gamut corresponding to the third linear RGB signal is the same as a color gamut corresponding to the display device.

Specifically, if the second linear RGB signal $R_{tm}G_{tm}B_{tm}$ belongs to a BT.2020 color gamut, and the third linear RGB signal $R_tG_tB_t$ belongs to a BT.709 color gamut, a preset color gamut conversion matrix is multiplexed by a primary color value matrix of the second linear RGB signal $R_{tm}G_{tm}B_{tm}$ to obtain a primary color value matrix of the third linear RGB signal $R_tG_tB_t$. A specific color gamut conversion calculation process is as follows:

$$\begin{pmatrix} R_t \\ G_t \\ B_t \end{pmatrix} = \begin{pmatrix} 1.6605 & -0.5876 & -0.0728 \\ -0.1246 & 1.1329 & -0.0083 \\ -0.0182 & -0.1006 & 1.1187 \end{pmatrix} \times \begin{pmatrix} R_{tm} \\ G_{tm} \\ B_{tm} \end{pmatrix} \quad (40)$$

$R_tG_tB_t$ obtained after such processing is a floating-point linear primary color value whose value is limited to a range of [0, 1].

A color gamut corresponding to the second linear RGB signal is consistent with a color gamut corresponding to the to-be-processed video signal, and the color gamut to which the third linear RGB signal belongs is consistent with the color gamut corresponding to the display device.

If the color gamut corresponding to the second linear RGB signal is BT.709, and the color gamut corresponding to the third linear RGB signal is BT.2020, the color gamut conversion matrix in the foregoing color gamut conversion calculation formula is modified, and details are not described herein.

In an optional case, if the color gamut corresponding to the second linear RGB signal is consistent with the color gamut corresponding to the display device, color gamut conversion may be not performed. Alternatively, when it is expected that a color gamut of a finally displayed video signal is consistent with the color gamut of the to-be-processed video signal, in other words, the color gamut corresponding to the second linear RGB signal is consistent with the color gamut corresponding to the third linear RGB signal, the color gamut conversion matrix may be a three-order identity matrix.

S205: Convert the third linear RGB signal based on an optical-electro transfer function, to obtain a second non-linear RGB signal.

Specifically, the second non-linear RGB signal is marked as $R'_tG'_tB'_t$.

A specific calculation manner of converting the third linear RGB signal $R_tG_tB_t$ into the second non-linear RGB signal $R'_tG'_tB'_t$ is as follows:

$$E'_t = \left(\dfrac{E_t}{200}\right)^{\frac{1}{\gamma'}} \quad (41)$$

The foregoing calculation manner is described by using an example in which the luminance range supported by the display device is [0, 200] nits. A value of $\gamma'$ may be 2.2, 2.4, or another value. This is not limited in this embodiment of this application.

S206: Perform color space conversion on the second non-linear RGB signal to obtain a first luminance-chrominance signal.

Specifically, the first luminance-chrominance signal is marked as $Y'_tCb_tCr_t$, and a color space conversion process is specifically as follows:

$$\begin{pmatrix} Y_{tf} \\ Cb_{tf} \\ Cr_{tf} \end{pmatrix} = \begin{pmatrix} 0.2126 & 0.7152 & 0.0722 \\ -0.1146 & -0.3854 & 0.5 \\ 0.5 & -0.4542 & -0.0458 \end{pmatrix} \times \begin{pmatrix} R'_t \\ G'_t \\ B'_t \end{pmatrix} \quad (42)$$

$$\begin{pmatrix} Y'_t \\ Cb'_t \\ Cr'_t \end{pmatrix} = \begin{pmatrix} 876 & 0 & 0 \\ 0 & 896 & 0 \\ 0 & 0 & 896 \end{pmatrix} \times \begin{pmatrix} Y_{tf} \\ Cb_{tf} \\ Cr_{tf} \end{pmatrix} + \begin{pmatrix} 64 \\ 512 \\ 512 \end{pmatrix} \quad (43)$$

$R'_tG'_tB'_t$ is a non-linear primary color value whose value is within the range of [0,1]. The signal $Y'_tCb_tCr_t$ obtained after such processing is a digital code value in a 10-bit limited range.

S207: Perform saturation mapping on a chrominance component of the first luminance-chrominance signal to obtain a second luminance-chrominance signal.

Specifically, S207 may include the following several steps.

S2071: Convert the temporary luminance value based on a preset saturation mapping curve, to obtain a saturation factor.

Specifically, a calculation process of the saturation factor is as follows:

(a) Calculate a non-linear display luminance value before luminance mapping.

$$Y_{dGMM} = \left(\frac{Y_d}{1000}\right)^{\frac{1}{\gamma'}} = \left(\frac{1000(Y_s)^{1.2}}{1000}\right)^{\frac{1}{\gamma'}} \quad (44)$$

(a) Calculate a non-linear display luminance value after the luminance mapping.

$$Y_{tGMM} = \left(\frac{Y_t}{1000}\right)^{\frac{1}{\gamma'}} \quad (45)$$

(c) Calculate the saturation factor.

$$SmGain = \begin{cases} \frac{Y_{tGMM}}{Y_{dGMM}} = \left(\frac{Y_t}{1000(Y_s^{1.2})}\right)^{\frac{1}{\gamma'}} & Y_s \neq 0 \\ 1 & Y_s = 0 \end{cases} \quad (46)$$

A value of γ' may be 2.2, 2.4, or another value. This is not limited in this embodiment of this application.

Specifically, the saturation factor corresponding to the temporary luminance value may be determined by using a second mapping relationship table. The second mapping relationship table is used to store a horizontal coordinate value and a vertical coordinate value of at least one sampling point on the saturation mapping curve.

S2072: Multiply a product of the saturation factor and a preset chrominance adjustment factor by a chrominance value of the chrominance component, to obtain an adjusted chrominance value.

Specifically, the preset chrominance adjustment factor may include a first adjustment factor $W_a$ and a second adjustment factor $W_b$. The first luminance-chrominance signal includes a first chrominance component $Cb_t$ and a second chrominance component $Cr_t$.

A calculation process of the second luminance-chrominance signal $Y_oCb_oCr_o$ is specifically as follows:

A first chrominance component of the second luminance-chrominance signal is $Cb_o=Cb_t\times SmGain\times W_a$.

A second chrominance component of the second luminance-chrominance signal is $Cr_o=Cr_t\times SmGain\times W_b$.

A luminance value of the second luminance-chrominance signal is $Y_o=Y'_t$.

The second luminance-chrominance signal $Y_oCb_oCr_o$ may be obtained based on the luminance value, the first chrominance component, and the second chrominance component of the second luminance-chrominance signal.

In a possible implementation, both the first adjustment factor $W_a$ and the second adjustment factor $W_b$ are 1, and a calculation process of the second luminance-chrominance signal is as follows:

$$\begin{pmatrix} Y_o \\ Cb_o \\ Cr_o \end{pmatrix} = \begin{pmatrix} 1 & 0 & 0 \\ 0 & SmGain & 0 \\ 0 & 0 & SmGain \end{pmatrix} \times \begin{pmatrix} Y'_t - 64 \\ Cb_t - 512 \\ Cr_t - 512 \end{pmatrix} + \begin{pmatrix} 64 \\ 512 \\ 512 \end{pmatrix} \quad (47)$$

The signal $Y_oCb_oCr_o$ is a digital code value in a 10-bit limited range.

In this embodiment of this application, a to-be-processed HDR video signal may be converted into an SDR signal, so that the SDR signal is correctly displayed on a display device that supports the SDR signal. In this embodiment of this application, luminance processing may be first performed on the to-be-processed video signal in a linear space, and then, color gamut conversion is performed on a luminance-processed signal, and a color gamut-converted signal is converted into a non-linear space, a color space is converted, and saturation processing is performed, to output a signal that matches a format supported by a display, so that the display correctly plays the video. This avoids problems such as picture distortion, inaccurate color performance, and loss of details. In addition, in this embodiment of this application, luminance processing and color gamut processing are combined, and after luminance of the video signal is processed, the chrominance component is correspondingly adjusted based on the luminance mapping curve and a luminance value of a luminance processing input signal, so that both the luminance and saturation of the video signal can be effectively adjusted. In the foregoing method, a relationship is formed for the luminance, a color gamut, and the saturation in terms of processing, so that signal conversion complexity is reduced, and signal conversion efficiency is improved.

It may be learned that, in the foregoing embodiment, a sequence of color gamut conversion and luminance mapping may be changed, and after color space conversion and non-linear space-to-linear space conversion are performed on the to-be-processed video signal, color gamut conversion is performed first, and then luminance processing is performed, and finally, saturation mapping is performed after a luminance-processed signal is converted from the linear space into the non-linear space and color space conversion is performed, to obtain a video signal that matches the display device.

It may be learned that the foregoing embodiment in FIG. 2 is also applicable to a scenario in which an SDR signal is converted into an HDR signal. To be specific, a format of the to-be-processed video signal is an SDR signal, and the signal format supported by the display-device is an HDR signal (an HDR HLG signal or an HLG PQ signal). In a specific implementation process, the electro-optical transfer function, the optical-electro transfer function, the color gamut conversion matrix, and the luminance mapping curve are changed.

Figure 4:
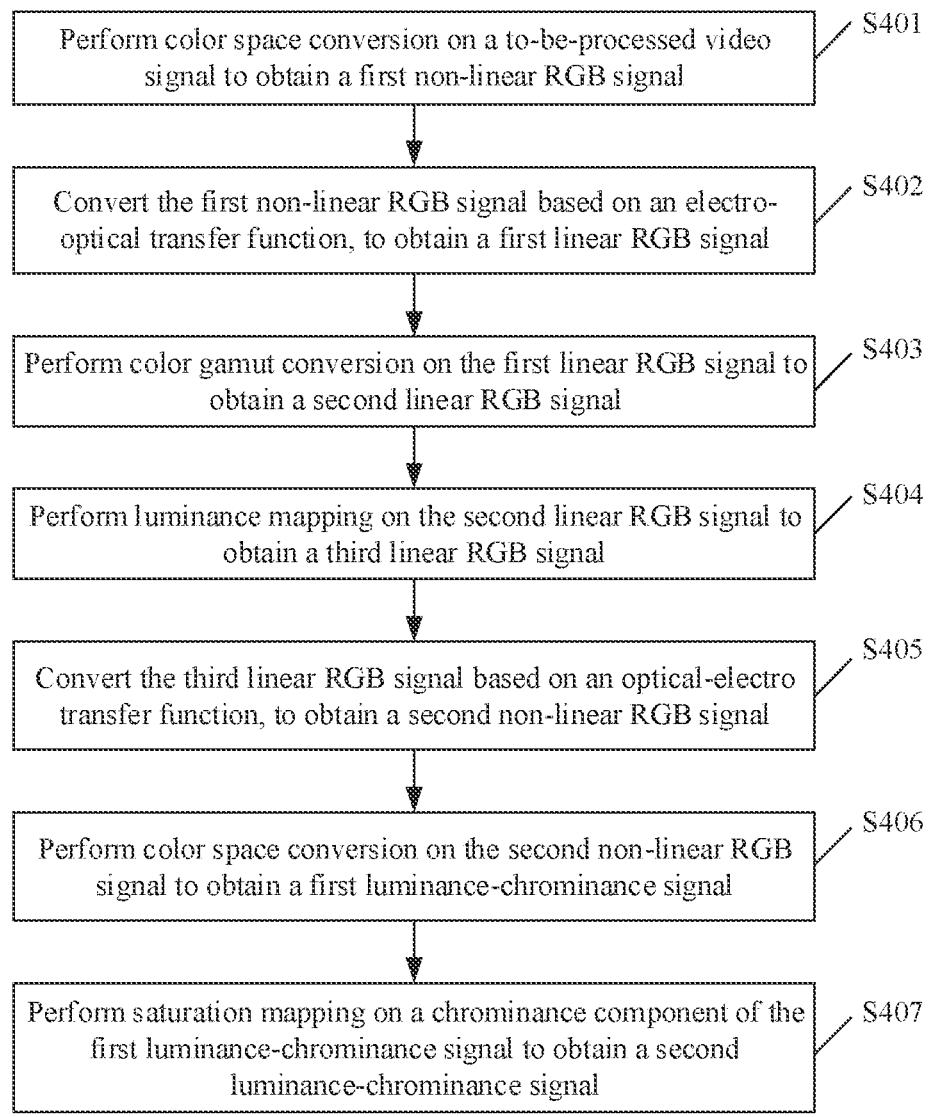
FIG. 4 is a flowchart of another example video signal processing method according to an embodiment of this application.

In a scenario of converting the SDR signal into the HDR signal, color space conversion and non-linear space-to-linear space conversion may be first performed on the to-be-processed signal, and then, color gamut conversion is performed first, and then luminance processing is performed, and finally, saturation mapping is performed after a luminance-processed signal is converted from the linear space into the non-linear space and color space conversion is performed, to obtain a video signal that matches the display device. Specifically as shown in FIG. 4, a video signal processing method may include at least the following several steps.

S401: Perform color space conversion on a to-be-processed video signal to obtain a first non-linear RGB signal.

Specifically, S401 is consistent with S201, and details are not described herein.

S402: Convert the first non-linear RGB signal based on an electro-optical transfer function, to obtain a first linear RGB signal.

Specifically, S402 is similar to S202, and only an electro-optical transfer function corresponding to an SDR signal needs to be changed. Details are not described herein.

S403: Perform color gamut conversion on the first linear RGB signal to obtain a second linear RGB signal, where a color gamut corresponding to the second linear RGB signal is the same as a color gamut corresponding to a display device.

Specifically, S403 is similar to S204, and only a color gamut conversion matrix corresponding to conversion from the SDR signal into an HDR signal needs to be changed. Details are not described herein.

S404: Perform luminance mapping on the second linear RGB signal to obtain a third linear RGB signal, where a luminance value range corresponding to the third linear RGB signal matches a luminance value range corresponding to the display device.

Specifically, S404 is similar to S203, and only a luminance mapping curve needs to be changed based on a luminance range of the to-be-processed video signal and a luminance range that matches the display device. Details are not described herein.

S405: Convert the third linear RGB signal based on an optical-electro transfer function, to obtain a second non-linear RGB signal.

Specifically, S405 is similar to S205, and only an optical-electro transfer function corresponding to the HDR signal needs to be changed. Details are not described herein.

S406: Perform color space conversion on the second non-linear RGB signal to obtain a first luminance-chrominance signal.

Specifically, S406 is consistent with S206, and details are not described herein.

S407: Perform saturation mapping on a chrominance component of the first luminance-chrominance signal to obtain a second luminance-chrominance signal.

Specifically, S407 is consistent with S207, and details are not described herein.

Figure 5:
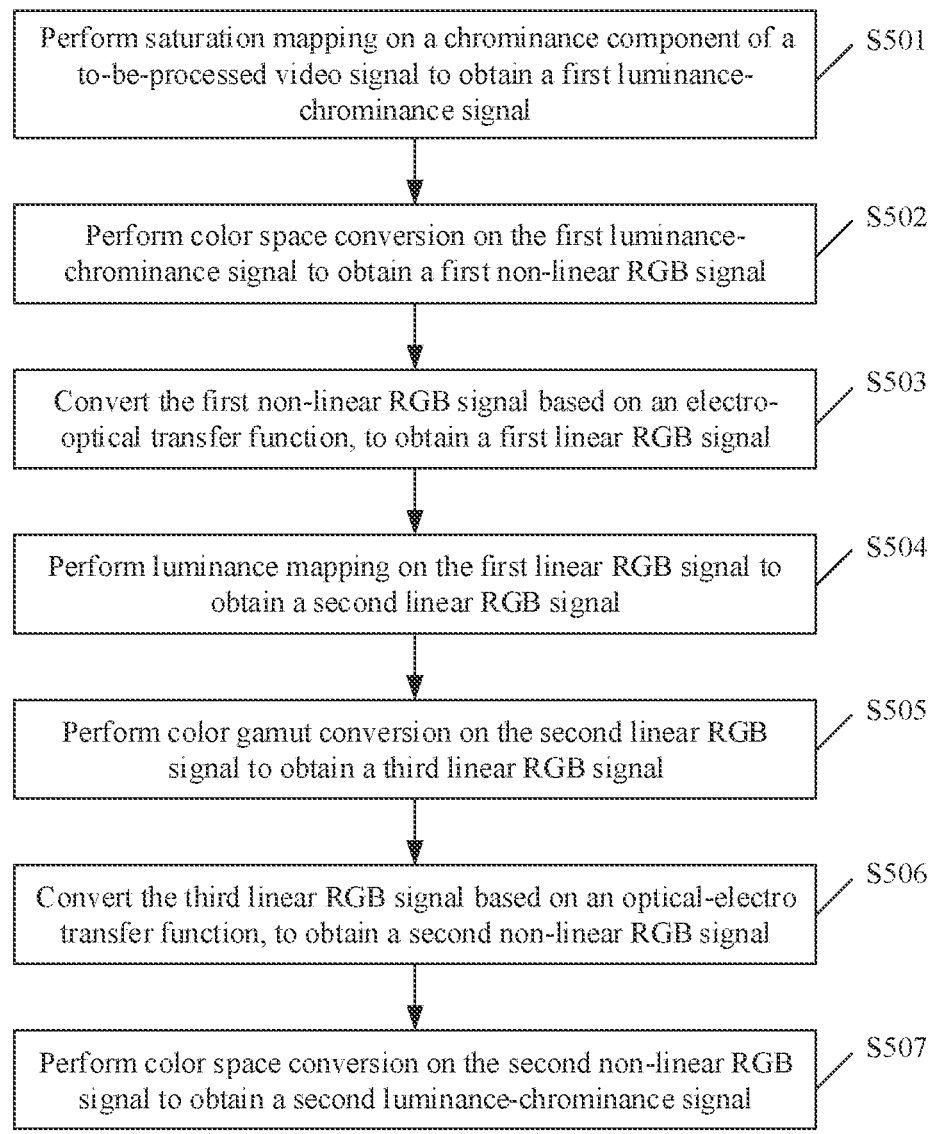
FIG. 5 is a flowchart of another example video signal processing method according to an embodiment of this application.

In another possible embodiment, in the video signal processing method, saturation mapping may be performed first, and then luminance mapping and color gamut conversion are performed. For a specific method procedure, refer to FIG. 5.

S501: Perform saturation mapping on a chrominance component of a to-be-processed video signal to obtain a first luminance-chrominance signal.

Specifically, a specific saturation mapping process is as follows.

S5011: Convert a luminance component of the to-be-processed video signal based on a preset saturation mapping curve, to obtain a saturation factor.

Specifically, the saturation mapping curve is determined based on a luminance mapping curve, the saturation mapping curve represents a correspondence between an initial luminance value before luminance mapping and a saturation mapping coefficient, and the saturation mapping coefficient is used to adjust a chrominance component of a saturation processing input signal. The luminance mapping relationship represents a correspondence between the initial luminance value before the luminance mapping and a luminance value after the luminance mapping. The luminance mapping relationship is used to perform luminance processing on a signal before the luminance mapping, to obtain a luminance-mapped signal.

Specifically, the luminance mapping curve may be a luminance mapping curve in a linear space, or may be a luminance mapping curve in a non-linear space.

When the luminance mapping curve is the luminance mapping curve in the linear space, the luminance mapping curve in the linear space is converted into a non-linear space in which the saturation processing input signal is located, to obtain the saturation mapping curve.

When the luminance mapping curve is the luminance mapping curve in the non-linear space, if the non-linear space in which the luminance mapping curve is located is inconsistent with the non-linear space in which the saturation processing input signal is located, the luminance mapping curve in the non-linear space is converted into a luminance mapping curve in a linear space, and then the luminance mapping curve in the linear space is converted into the non-linear space in which the saturation processing input signal is located, to obtain the saturation mapping curve. When the non-linear space in which the luminance mapping curve is located is consistent with the non-linear space in which the saturation processing input signal is located, the luminance mapping curve is the saturation mapping curve.

Specifically, for a calculation process of the saturation factor, refer to a calculation process of S2071 in the embodiment in FIG. 2. Details are not described herein.

S5012: Multiply a product of the saturation factor and a preset chrominance adjustment factor by a chrominance value of the chrominance component, to obtain an adjusted chrominance value.

Specifically, for a calculation process of the adjusted chrominance value, refer to a calculation process of S2072 in the embodiment in FIG. 2. Details are not described herein.

S502: Perform color space conversion on the first luminance-chrominance signal to obtain a first non-linear RGB signal.

Specifically, for a color space conversion process, refer to S201 in the embodiment in FIG. 2. Details are not described herein.

S503: Convert the first non-linear RGB signal based on an electro-optical transfer function, to obtain a first linear RGB signal.

Specifically, for an electro-optical transfer process, refer to descriptions of S202 in the embodiment in FIG. 2. A specific electro-optical transfer function is determined based on a format of the to-be-processed video signal. When the to-be-processed video signal is an SDR signal, the electro-optical transfer function is a gamma curve. When the to-be-processed video signal is an HDR HLG signal, the electro-optical transfer function is an HLG $OETF^{-1}$ curve. When the to-be-processed video signal is an HDR PQ signal, the electro-optical transfer function is a PQ EOTF curve.

S504: Perform luminance mapping on the first linear RGB signal to obtain a second linear RGB signal, where a luminance value range corresponding to the second linear RGB signal is the same as a luminance value range corresponding to a display device.

Specifically, a luminance mapping process may include the following several steps.

S5041: Calculate a temporary luminance value based on each primary color value of the first linear RGB signal.

Specifically, S5041 is similar to S2031, and details are not described herein.

S5042: Convert the temporary luminance value based on a preset luminance mapping curve, to obtain an adjustment coefficient.

Specifically, S5042 is similar to S2032, and details are not described herein. The luminance mapping curve is determined by the format of the to-be-processed video signal.

S5043: Multiply each primary color value by the adjustment coefficient to obtain the second linear RGB signal.

Specifically, S5043 is similar to S2033, and details are not described herein.

S505: Perform color gamut conversion on the second linear RGB signal to obtain a third linear RGB signal, where a color gamut corresponding to the third linear RGB signal is the same as a color gamut corresponding to the display device.

Specifically, a color gamut conversion process is similar to S204. A corresponding color gamut conversion matrix is specifically adjusted for different conversion scenarios. Details are not described herein.

S506: Convert the third linear RGB signal based on an optical-electro transfer function, to obtain a second non-linear RGB signal.

Specifically, the optical-electro transfer function is determined by a signal format supported by the display device. Specific implementation is similar to S205 in the embodiment in FIG. 2, and details are not described herein.

S507: Perform color space conversion on the second non-linear RGB signal to obtain a second luminance-chrominance signal.

Specifically, color space conversion is consistent with S206, and details are not described herein.

This embodiment of this application is applicable to a scenario in which a to-be-processed HDR HLG signal is converted into an SDR signal, a scenario in which a to-be-processed HDR PQ signal is converted into an SDR signal, and a scenario in which a to-be-processed SDR signal is converted into an HDR HLG signal or an HDR PQ signal. In this embodiment of this application, the to-be-processed video signal can be correctly displayed on the display device. Saturation mapping is first performed on the to-be-processed video signal, and then, luminance mapping is performed on a saturation-mapped signal in the linear space, and then color gamut conversion is performed on a luminance-mapped signal, and a color gamut-converted signal is converted into the non-linear space and a color space is converted, to output a signal that matches a format supported by a display, so that the display correctly plays the video. This avoids problems such as picture distortion, inaccurate color performance, and loss of details. In addition, in this embodiment of this application, luminance processing and color gamut processing are combined, and before luminance of the video signal is processed, the chrominance component is correspondingly adjusted based on the luminance mapping curve, so that both the luminance and saturation of the video signal can be effectively adjusted. In the foregoing method, a relationship is formed for the luminance, a color gamut, and the saturation in terms of processing, so that signal conversion complexity is reduced, and signal conversion efficiency is improved.

For example, an embodiment of this application further provides another video signal processing method. The method is applicable to the following scenario: A to-be-processed video signal is an HDR HLG signal whose luminance range is [0, 1000] nits and color gamut range is BT.2020, a signal format supported by a display device is an SDR signal, a luminance range supported by the display device is [0, 200] nits, and a color gamut range supported by the display-device is BT.709.

It is assumed that $Y'_s Cb_s Cr_s$ is a 4:4:4 YCbCr non-linear video signal that is restored by a terminal through AVS2 decoding and reconstruction and chrominance upsampling. Each component is a 10-bit digital code value.

The method may specifically include the following several steps.

1. Perform saturation mapping on the to-be-processed video signal, and calculate a saturation-mapped signal $Y_i Cb_i Cr_i$.

(1) Calculate normalized original luminance $Y_{norm}$.

$$Y_{norm}=(Y_s-64)/(940-64) \tag{48}$$

$Y_{norm}$ needs to be limited to a range of [0, 1].

(2) Calculate a saturation mapping gain SmGain (in other words, the saturation factor in the foregoing embodiments).

$$SmGain=f_{sm}(Y_{norm}) \tag{49}$$

where $f_{sm}(\ )$ is a saturation mapping curve, and is calculated based on a luminance mapping curve $f_{tm}(\ )$. Calculation steps of $f_{sm}(\ )$ are as follows:

(a) Convert the luminance mapping curve $f_{tm}(\ )$ into a linear space, to obtain a linear luminance mapping curve.

$$f_{tmL}(L)=PQ\_EOTF(f_{tm}(PQ\_EOTF^{-1}(L))) \tag{50}$$

L is input linear luminance in units of nits, and a result of $f_{tmL}(L)$ is linear luminance in units of nits.

(b) Convert the linear luminance mapping curve $f_{tmL}(\ )$ into an HLG space, to obtain a luminance mapping curve on an HLG signal.

$$f_{tmHLG}(e) = HLG\_OETF \left( \frac{PQ\_EOTF(f_{tm}(PQ\_EOTF^{-1}(1000*HLG\_OETF^{-1}(e))))}{1000} \right), \tag{51}$$

where e is normalized luminance of the HLG signal, and a result of $f_{tmHLG}(e)$ is the normalized luminance of the HLG signal.

(c) Calculate a saturation mapping curve $f_{sm}(\ )$.

$$f_{sm}(e) = \frac{f_{tmHLG}(e)}{e} = HLG\_OETF \left( \frac{PQ\_EOTF(f_{tm}(PQ\_EOTF^{-1}(1000*HLG\_OETF^{-1}(e))))}{1000} \right) / e \tag{52}$$

(3) Calculate a saturation-mapped signal $Y_i Cb_i Cr_i$.

$$\begin{pmatrix} Y_i \\ Cb_i \\ Cr_i \end{pmatrix} = \begin{pmatrix} 1 & 0 & 0 \\ 0 & SmGain & 0 \\ 0 & 0 & SmGain \end{pmatrix} \times \begin{pmatrix} Y'_s - 64 \\ Cb_s - 512 \\ Cr_s - 512 \end{pmatrix} + \begin{pmatrix} 64 \\ 512 \\ 512 \end{pmatrix} \tag{53}$$

The signal $Y_i Cb_i Cr_i$ is ad digital code value in a 10-bit limited range, where a value of $Y_i$ needs to be in a range of [64,940], and values of $Cb_i$ and $Cr_i$ need to be in a range of [64, 960].

2. Perform color space conversion on the signal $Y_i Cb_i Cr_i$ to obtain a non-linear signal $R'_s G'_s B'_s$.

$$\begin{pmatrix} Y_{sf} \\ Cb_{sf} \\ Cr_{sf} \end{pmatrix} = \begin{pmatrix} \frac{1}{876} & 0 & 0 \\ 0 & \frac{1}{896} & 0 \\ 0 & 0 & \frac{1}{896} \end{pmatrix} \times \begin{pmatrix} Y_i - 64 \\ Cb_i - 512 \\ Cr_i - 512 \end{pmatrix} \tag{54}$$

-continued $$\begin{pmatrix} R'_s \\ G'_s \\ B'_s \end{pmatrix} = \begin{pmatrix} 1 & 0 & 1.4746 \\ 1 & -0.1645 & -0.5713 \\ 1 & 1.8814 & 0 \end{pmatrix} \times \begin{pmatrix} Y_{sf} \\ Cb_{sf} \\ Cr_{sf} \end{pmatrix} \quad (55)$$

A signal $Y'_s Cb_s Cr_s$ is a digital code value in a 10-bit limited range, and $R'_s G'_s B'_s$ obtained after such processing is a floating-point non-linear primary color value whose value needs to be limited to the range of [0, 1].

3. Convert the non-linear signal $R'_s G'_s B'_s$ into a linear signal $R_s G_s B_s$, and calculate linear luminance $Y_s$ of an input signal.

$$E_S = HLG\_OETF^{-1}(E_S') \quad (56)$$

$E_s$ in the equation represents a linear primary color value of any component in the signal $R_s G_s B_s$, and a value of $E_s$ is in the range of [0, 1], $E_s'$ is a non-linear primary color value of a component that is in $R'_s G'_s B'_s$ and that corresponds to the component represented by $E_s$. A function HLG_OETF$^{-1}$( ) is defined as follows based on ITU BT.2100:

$$HLG_{OETF}^{-1}(E') = \begin{cases} \dfrac{E'^2}{3} & 0 \le E' \le \dfrac{1}{2} \\ \dfrac{\exp\left(\dfrac{(E'-c)}{a}\right)+b}{12} & \dfrac{1}{2} < E' \le 1 \end{cases} \quad (57)$$

where
a=0.17883277, b=1−4a, and c=0.5−a*ln(4a).
The linear luminance $Y_s$ is calculated as follows:

$$Y_s = 0.2627 R_s + 0.6780 G_s + 0.0593 B_s \quad (58)$$

$Y_s$ is a real number whose value is in the range of [0, 1].

4. Calculate a luminance value $Y_t$ obtained after the luminance mapping.

(1) Calculate display luminance $Y_d$.

$$Y_d = 1000(Y_s)^{1.2} \quad (59)$$

(2) Calculate visual linear luminance $Y_{dPQ}$.

$$Y_{dPQ} = PQ\_EOTF^{-1}(Y_d), \text{ where} \quad (60)$$

$$PQ\_EOTF^{-1}(E) = \left(\frac{c_1 + c_2(E/10000)^{m_1}}{1 + c_3(E/10000)^{m_1}}\right)^{m_2};$$

$m_1 = 2610/16384 = 0.1593017578125;$ $m_2 = 2523/4096 * 128 = 78.84375;$ $c_1 = 3424/4096 = 0.8359375 = c_3 - c_2 + 1;$ $c_2 = 2413/4096 * 32 = 18.8515625;$ and $c_3 = 2392/4096 * 32 = 18.6875.$ (3) Perform luminance mapping to obtain $Y_{tPQ}$.

$$Y_{tPQ} = f_{tm}(Y_{dPQ}) \quad (61)$$

$f_{tm}( )$ in the equation is defined as follows:

$$f_{tm}(e) = \begin{cases} e, & \text{when } e \le 0.4064 \\ hmt(e), & \text{when } 0.4064 < e \le 0.7518 \\ 0.579133, & \text{when } e > 0.7518 \end{cases} \quad (62)$$

A function hmt( ) is defined as follows:

$$hmt(x) = 0.4064 \times \alpha_0(x) + 0.5791 \times \alpha_1(x) + \beta_0(x) \quad (63)$$

$$\begin{cases} \alpha_0(x) = \dfrac{(-0.4675 + 2x)(0.7518 - x)^2}{0.0412} \\ \alpha_1(x) = \dfrac{(1.849 - 2x)(x - 0.4064)^2}{0.0412} \\ \beta_0(x) = \dfrac{(x - 0.4064)(x - 0.7518)^2}{0.1193} \end{cases} \quad (64)$$

(4) Calculate normalized linear luminance $Y_t$ obtained after the luminance mapping.

$$Y_t = PQ\_EOTF(Y_{tPQ}), \text{ where} \quad (65)$$

$$PQ\_EOTF(E') = 10000\left(\frac{\max\left[(E'^{1/m_2} - c_1), 0\right]}{c_2 - c_3 E'^{1/m_2}}\right)^{1/m_1}.$$

Therefore, a calculation formula of $Y_t$ is:

$$Y_t = PQ\_EOTF(f_{tm}(PQ\_EOTF^{-1}(1000(Y_s)^{1.2}))) \quad (66)$$

$Y_t$ is a real number whose value needs to be limited to a range of [0, 200].

5. Calculate a luminance mapping gain TmGain (in other words, the adjustment coefficient in the foregoing embodiments).

A calculation formula of the luminance mapping gain TmGain is as follows:

$$TmGain = \begin{cases} \dfrac{Y_t}{Y_s}, & Y_s \ne 0 \\ 0, & Y_s = 0 \end{cases} \quad (67)$$

6. Perform luminance mapping on the linear signal $R_s G_s B_s$ to obtain a luminance-mapped signal $R_{tm} G_{tm} B_{tm}$.

$$E_{tm} = E_s \times TmGain \quad (68)$$

$E_s$ in the equation represents any component in the signal $R_s G_s B_s$, and $E_{tm}$ represents a component that is in $R_{tm} G_{tm} B_{tm}$ and that corresponds to the component represented by $E_s$.

7. Calculate a signal $R_t G_t B_t$ obtained after color gamut mapping is performed on the signal $R_{tm} G_{tm} B_{tm}$.

$$\begin{pmatrix} R_t \\ G_t \\ B_t \end{pmatrix} = \begin{pmatrix} 1.6605 & -0.5876 & -0.0728 \\ -0.1246 & 1.1329 & -0.0083 \\ -0.0182 & -0.1006 & 1.1187 \end{pmatrix} \times \begin{pmatrix} R_{tm} \\ G_{tm} \\ B_{tm} \end{pmatrix} \quad (69)$$

The signal $R_t G_t B_t$ obtained after such processing is a floating-point linear primary color value whose value needs to be limited to the range of [0, 200].

8. Calculate a signal $R'_t G'_t B'_t$ obtained after $R_t G_t B_t$ is converted into a non-linear space.

$$E'_t = (E_t/200)^{1/\gamma} \quad (70)$$

It should be understood that γ in the formula (70) may be 2.2, 2.4, or another value. A value of γ may be selected based on an actual situation. This is not limited in this embodiment of this application.

9. Perform color space conversion on the non-linear signal $R'_t G'_t B'_t$ to obtain $Y'_t Cb_t Cr_t$ $$\begin{pmatrix} Y_{tf} \\ Cb_{tf} \\ Cr_{tf} \end{pmatrix} = \begin{pmatrix} 0.2126 & 0.7152 & 0.0722 \\ -0.1146 & -0.3854 & 0.5 \\ 0.5 & -0.4542 & -0.0458 \end{pmatrix} \times \begin{pmatrix} R'_t \\ G'_t \\ B'_t \end{pmatrix} \quad (71)$$

$$\begin{pmatrix} Y'_t \\ Cb_t \\ Cr_t \end{pmatrix} = \begin{pmatrix} 876 & 0 & 0 \\ 0 & 896 & 0 \\ 0 & 0 & 896 \end{pmatrix} \times \begin{pmatrix} Y_{tf} \\ Cb_{tf} \\ Cr_{tf} \end{pmatrix} + \begin{pmatrix} 64 \\ 512 \\ 512 \end{pmatrix} \quad (72)$$

$R'_t G'_t B'_t$ is a non-linear primary color value whose value is in the range of [0, 1]. The signal $Y'_t Cb_t Cr_t$ obtained after such processing is a digital code value in a 10-bit limited range, where a value of $Y_t$ needs to be in the range of [64, 940], and values of $Cb_t$ and $Cr_t$ need to be in the range of [64, 960].

Figure 6:
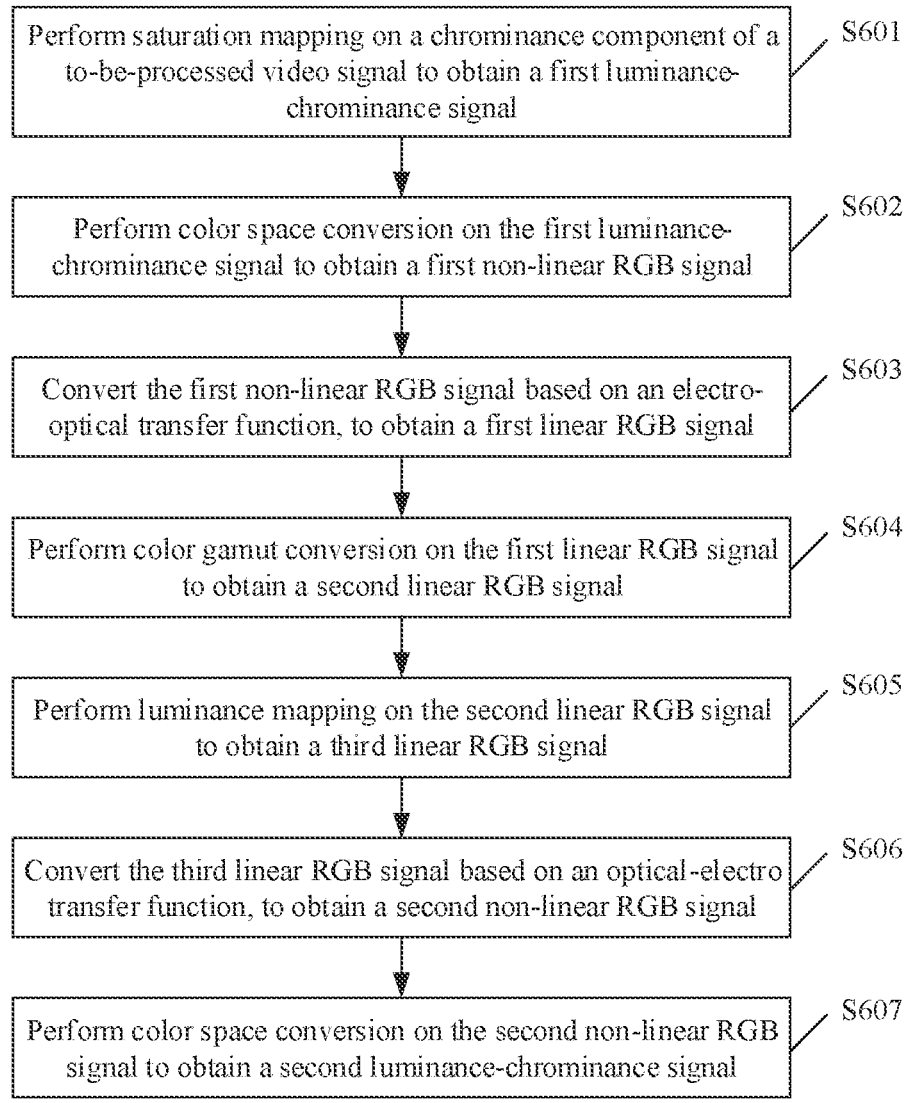
FIG. 6 is a flowchart of another example video signal processing method according to an embodiment of this application.

It may be learned that, in the foregoing embodiment, a sequence of color gamut conversion and luminance mapping may be changed, and after color space conversion and non-linear space-to-linear space conversion are performed on a saturation-processed signal, color gamut conversion is performed first, and then luminance processing is performed, and finally, a luminance-processed signal is converted from the linear space into the non-linear space and color space conversion is performed, to obtain a video signal that matches the display device. Specifically as shown in FIG. 6, a video signal processing method may include at least the following several steps.

S601: Perform saturation mapping on a chrominance component of a to-be-processed video signal to obtain a first luminance-chrominance signal.

Specifically, S601 is consistent with S501, and details are not described herein.

S602: Perform color space conversion on the first luminance-chrominance signal to obtain a first non-linear RGB signal.

Specifically, S602 is consistent with S502, and details are not described herein.

S603: Convert the first non-linear RGB signal based on an electro-optical transfer function, to obtain a first linear RGB signal.

Specifically, S603 is consistent with S503, and details are not described herein.

S604: Perform color gamut conversion on the first linear RGB signal to obtain a second linear RGB signal, where a color gamut corresponding to the second linear RGB signal is the same as a color gamut corresponding to a display device.

Specifically. S604 is similar to S505, and details are not described herein.

S605: Perform luminance mapping on the second linear RGB signal to obtain a third linear RGB signal, where a luminance value range corresponding to the third linear RGB signal is the same as a luminance value range corresponding to the display device.

Specifically, S605 is similar to S504, and details are not described herein.

S606: Convert the third linear RGB signal based on an optical-electro transfer function, to obtain a second non-linear RGB signal.

Specifically, S606 is consistent with S506, and details are not described herein.

S607: Perform color space conversion on the second non-linear RGB signal to obtain a second luminance-chrominance signal.

Specifically, S607 is consistent with S507, and details are not described herein.

Figure 7:
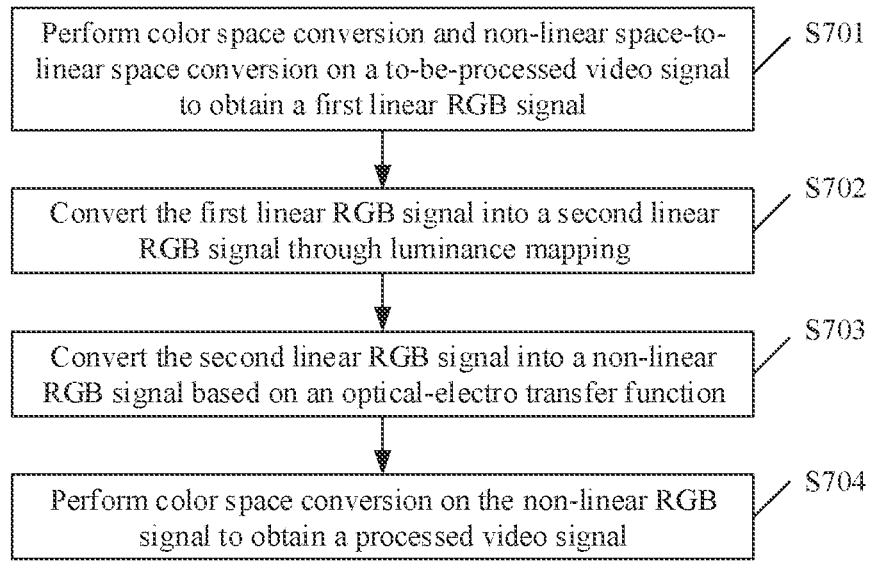
FIG. 7 is a flowchart of another example video signal processing method according to an embodiment of this application.

In another possible embodiment, the video signal processing method may be applicable to conversion of a to-be-processed HDR HLG signal into an HDR PQ signal. A specific video signal processing method is shown in FIG. 7.

S701: Perform color space conversion and non-linear space-to-linear space conversion on a to-be-processed video signal to obtain a first linear RGB signal.

Specifically, color space conversion is first performed on the to-be-processed video signal $Y'_s Cb_s Cr_s$, to obtain a non-linear signal $R'_s G'_s B'_s$.

It is assumed that $Y'_s Cb_s Cr_s$ is a 4:4:4 YCbCr non-linear video signal that is restored by a terminal through AVS2 decoding and reconstruction and chrominance upsampling. Each component is a 10-bit digital code value.

$$\begin{pmatrix} Y_{sf} \\ Cb_{sf} \\ Cr_{sf} \end{pmatrix} = \begin{pmatrix} \frac{1}{876} & 0 & 0 \\ 0 & \frac{1}{896} & 0 \\ 0 & 0 & \frac{1}{896} \end{pmatrix} \times \begin{pmatrix} Y'_s - 64 \\ Cb_s - 512 \\ Cr_s - 512 \end{pmatrix} \quad (73)$$

$$\begin{pmatrix} R'_s \\ G'_s \\ B'_s \end{pmatrix} = \begin{pmatrix} 1 & 0 & 1.4746 \\ 1 & -0.1645 & -0.5713 \\ 1 & 1.8814 & 0 \end{pmatrix} \times \begin{pmatrix} Y_{sf} \\ Cb_{sf} \\ Cr_{sf} \end{pmatrix} \quad (74)$$

The signal $Y'_s Cb_s Cr_s$ is a digital code value in a 10-bit limited range, and $R'_s G'_s B'_s$ obtained after such processing is a floating-point non-linear primary color value whose value needs to be limited to a range of [0, 1].

Then, the non-linear signal $R'_s G'_s B'_s$ is converted into a first linear RGB signal $R_s G_s B_s$ by using an electro-optical transfer function. A specific conversion process is as follows:

$$E_S = HLG\_OETF^{-1}(E'_s) \quad (75)$$

$E_s$ in the equation represents any component in the signal $R_s G_s B_s$, and $E_s'$ is a component that is in the signal $R'_s G'_s B'_s$ and that corresponds to the component represented by $E_s$. A function $HLG\_OETF^{-1}(\ )$ is defined as follows based on ITU BT.2100:

$$HLG\_OETF^{-1}(E') = \begin{cases} \dfrac{E'^2}{3} & 0 \le E' \le \dfrac{1}{2} \\ \dfrac{\exp\left(\dfrac{(E'-c)}{a}\right) + b}{12} & \dfrac{1}{2} \le E' \le 1 \end{cases} \quad (76)$$

where $a = 0.17883277$, $b = 1 - 4a$, and $c = 0.5 - a*\ln(4a)$.

S702: Convert the first linear RGB signal into a second linear RGB signal through luminance mapping.

Specifically, S702 includes the following several steps.

S7021: Calculate a scene luminance value based on each primary color value of the first linear RGB signal.

Specifically, the scene luminance value is $Y_s = 0.2627 R_S + 0.6780 G_S + 0.0593 B_S$.

S7022: Adjust the scene luminance value based on a rated display luminance peak value and a system gamma value of a display device, to obtain a display luminance value.

Specifically, display luminance is $Y_d = Y_s^\gamma * L_W$, where $Y_d$ is the display luminance value, $Y_s$ is the scene luminance value, $L_w$ is the rated display luminance peak value, $\gamma$ is the system gamma value, and $\gamma = 1.2 + 0.42 * \log_{10}(L_W/1000)$. In this embodiment, maximum luminance of an input signal is set to $L_w = 1000$ nits. Certainly, $L_w$ may be alternatively set to another value. This is specifically determined by a luminance range of the input signal.

S7023: Multiply each primary color value by a ratio of the display luminance value to the scene luminance value, to obtain the second linear RGB signal.

Specifically, the ratio of the display luminance value to the scene luminance value is a luminance mapping gain TmGain.

Calculation of the luminance mapping gain TmGain is shown in the following equation.

$$TmGain = \begin{cases} \frac{Y_d}{Y_s}, & Y_s \neq 0 \\ 0, & Y_s = 0 \end{cases} \quad (77)$$

A process of multiplying each primary color value by the ratio of the display luminance value to the scene luminance value, to obtain the second linear RGB signal is as follows:

$$E_t = E_s \times TmGain \quad (78)$$

$E_s$ in the equation represents any component in the signal $R_s G_s B_s$, and $E_t$ is a component that is in the second linear RGB signal $R_t G_t B_t$ and that corresponds to the component represented by $E_s$.

S703: Convert the second linear RGB signal into a non-linear RGB signal based on an optical-electro transfer function.

Specifically, the non-linear RGB signal is marked as $R'_t G'_t B'_t$. An optical-electro transfer process is as follows:

$$E'_t = PQ\_EOTF^{-1}(E_t) \quad (79)$$

For a function $PQ\_EOTF^{-1}(\ )$ in the equation, definitions are as follows with reference to ITU BT.2100:

$$PQ\_EOTF^{-1}(E) = \left(\frac{c_1 + c_2(E/10000)^{m_1}}{1 + c_3(E/10000)^{m_1}}\right)^{m_2}, \text{where} \quad (80)$$

$m_1 = 2610/16384 = 0.1593017578125;$ $m_2 = 2523/4096 * 128 = 78.84375;$ $c_1 = 3424/4096 = 0.8359375 = c_3 - c_2 + 1;$ $c_2 = 2413/4096 * 32 = 18.8515625;$ and $c_3 = 2392/4096 * 32 = 18.6875.$ S704: Perform color space conversion on the non-linear RGB signal to obtain a processed video signal, where a signal format of the processed video signal adapts to the display device.

Specifically, a process of performing color space conversion on the non-linear RGB signal $R'_t G'_t B'_t$ in S503 to obtain the processed signal $Y'_t Cb_t Cr_t$ is as follows:

$$\begin{pmatrix} Y_{tf} \\ Cb_{tf} \\ Cr_{tf} \end{pmatrix} = \begin{pmatrix} 0.2627 & 0.6780 & 0.0593 \\ -0.1396 & -0.3604 & 0.5 \\ 0.5 & -0.4598 & -0.0402 \end{pmatrix} \times \begin{pmatrix} R'_t \\ G'_t \\ B'_t \end{pmatrix} \quad (81)$$

$$\begin{pmatrix} Y'_t \\ Cb_t \\ Cr_t \end{pmatrix} = \begin{pmatrix} 876 & 0 & 0 \\ 0 & 896 & 0 \\ 0 & 0 & 896 \end{pmatrix} \times \begin{pmatrix} Y_{tf} \\ Cb_{tf} \\ Cr_{tf} \end{pmatrix} + \begin{pmatrix} 64 \\ 512 \\ 512 \end{pmatrix} \quad (82)$$

$R'_t G'_t B'_t$ is a floating-point non-linear primary color value whose value is in the range of [0, 1], The signal $Y'_t Cb_t Cr_t$ obtained after such processing is a digital code value in a 10-bit limited range.

In this embodiment of this application, a to-be-processed HDR HLG signal may be converted into an HDR PQ signal, so that a video signal in an HDR HLG format can be correctly displayed on a display device that supports an HDR PQ signal format. This avoids problems such as picture distortion, inaccurate color performance, and loss of details.

Figure 8:
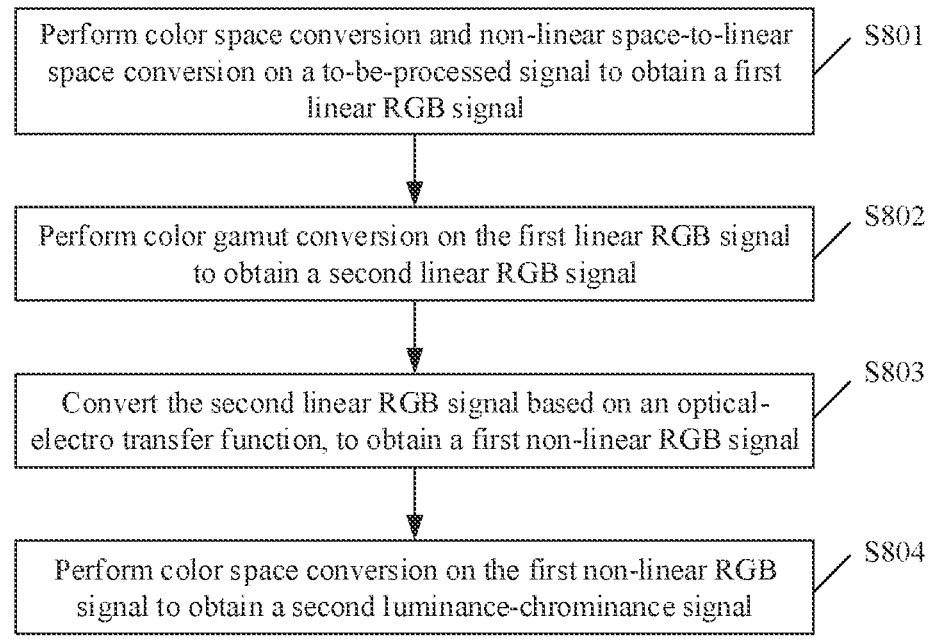
FIG. 8 is a flowchart of another example video signal processing method according to an embodiment of this application.

In another possible embodiment, the video signal processing method may be applicable to conversion of a to-be-processed SDR signal in a BT.2020 color gamut into an SDR signal in BT.709. A specific video signal processing method is shown in FIG. 8.

S801: Perform color space conversion and non-linear space-to-linear space conversion on a to-be-processed video signal to obtain a first linear RGB signal.

Specifically, the color space conversion and the non-linear space-to-linear space conversion are similar to those in S501, and the electro-optical transfer function in S501 is changed into a gamma curve. Details are not described herein.

S802: Perform color gamut conversion on the first linear RGB signal to obtain a second linear RGB signal.

A color gamut corresponding to the second linear RGB signal is the same as a color gamut corresponding to a display device.

Specifically, a color gamut conversion process is consistent with a calculation process in S204, and details are not described herein.

S803: Convert the second linear RGB signal based on an optical-electro transfer function, to obtain a first non-linear RGB signal.

Specifically, a signal format supported by the display device is an SDR signal. For example, the optical-electro transfer function may be calculated by using a gamma curve, and a specific optical-electro transfer process is as follows:

$$E' = E^{\frac{1}{2.2}} \quad 0 \leq E \leq 1, \quad (83)$$

where

E is any component in the second linear RGB signal, and E' is a component that is in the first non-linear RGB signal and that corresponds to the component represented by E.

S804: Perform color space conversion on the first non-linear RGB signal to obtain a second luminance-chrominance signal, where a signal format of the second luminance-chrominance signal adapts to the display device.

Specifically, a color space conversion process is consistent with S504, and details are not described herein.

In this embodiment of this application, a to-be-processed SDR signal in a BT.2020 color gamut may be converted into an SDR signal in BT.709, so that the SDR signal in the BT.2020 color gamut can be correctly displayed on a display device that supports an SDR signal format in the BT.709. This avoids problems of picture distortion and inaccurate color performance.

Figure 9:
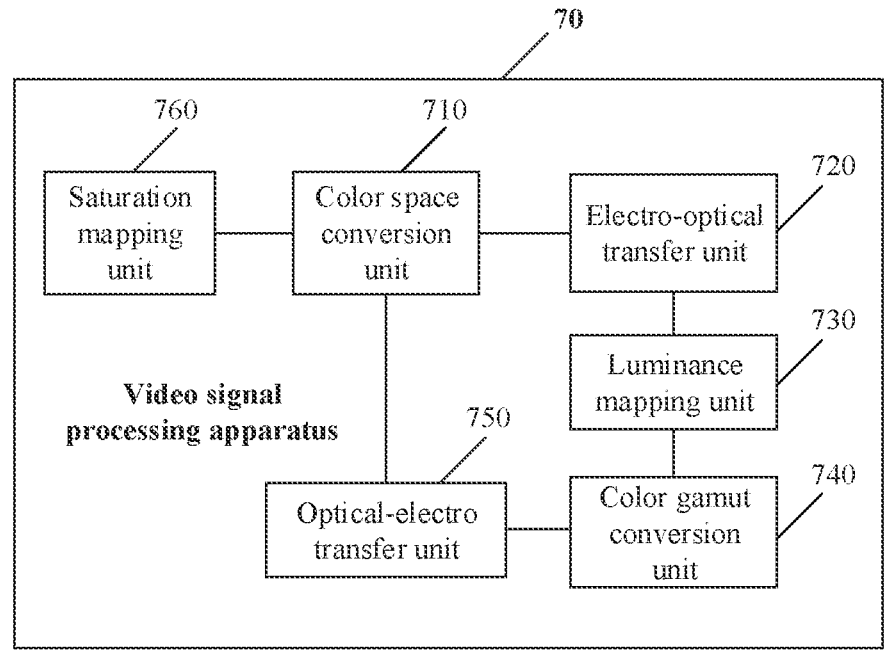
FIG. 9 is a structural diagram of an example video signal processing apparatus according to an embodiment of this application.

An embodiment of this application further provides a corresponding video signal processing apparatus. As shown in FIG. 9, a video signal processing apparatus 70 may include at least a color space conversion unit 710, an electro-optical transfer unit 720, a luminance mapping unit 730, a color gamut conversion unit 740, an optical-electro transfer unit 750, and a saturation mapping unit 760.

The color space conversion unit 710 is configured to perform color space conversion on a to-be-processed video signal to obtain a first non-linear RGB signal. For details, refer to descriptions of S201. Details are not described herein.

The electro-optical transfer unit 720 is configured to convert the first non-linear RGB signal based on an electro-optical transfer function, to obtain a first linear RGB signal. For details, refer to descriptions of S202. Details are not described herein.

The luminance mapping unit 730 is configured to perform luminance mapping on the first linear RGB signal to obtain a second linear RGB signal, where a luminance value range corresponding to the second linear RGB signal is the same as a luminance value range corresponding to a display device. For details, refer to descriptions of S203. Details are not described herein.

The color gamut conversion unit 740 is configured to perform color gamut conversion on the second linear RGB signal to obtain a third linear RGB signal, where a color gamut corresponding to the third linear RGB signal is the same as a color gamut corresponding to the display device. For details, refer to descriptions of S204. Details are not described herein.

The optical-electro transfer unit 750 is configured to convert the third linear RGB signal to obtain a second non-linear RGB signal. For details, refer to descriptions of S205. Details are not described herein.

The color space conversion unit 710 is further configured to perform color space conversion on the second non-linear RGB signal to obtain a first luminance-chrominance signal. For details, refer to descriptions of S206. Details are not described herein.

The saturation mapping unit 760 is configured to perform saturation mapping on a chrominance component of the first luminance-chrominance signal to obtain a second luminance-chrominance signal. For details, refer to descriptions of S207 Details are not described herein.

In a possible embodiment, the to-be-processed video signal is a HDR signal, and the second luminance-chrominance signal is a SDR signal.

In a possible embodiment, the luminance mapping unit 730 may include a first calculation subunit 7310, a first conversion subunit 7320, and a first obtaining subunit 7330.

The first calculation subunit 7310 is configured to calculate a temporary luminance value based on each primary color value of the first linear RGB signal. For details, refer to descriptions of S2031. Details are not described herein.

The first conversion subunit 7320 is configured to convert the temporary luminance value based on a preset luminance mapping curve, to obtain an adjustment coefficient. For details, refer to descriptions of S2032. Details are not described herein.

The first obtaining subunit 7330 is configured to multiply each primary color value by the adjustment coefficient to obtain a third linear RGB signal. For details, refer to descriptions of S2033. Details are not described herein.

In a possible embodiment, the temporary luminance value is calculated according to the following formula:

$$Y = C_1 \times R + C_2 \times G + C_3 \times B \qquad (84), \text{where}$$

Y is the temporary luminance value, R, G, and B are respectively primary color values of the first linear RGB signal, $C_1$=0.2627, $C_2$=0.678, and $C_3$=0.0593.

In a possible embodiment, the first conversion subunit 7320 is configured to determine, by using a first mapping relationship table, the adjustment coefficient corresponding to the temporary luminance value, where the first mapping relationship table is used to store a horizontal coordinate value and a vertical coordinate value of at least one sampling point on the luminance mapping curve.

In a possible embodiment, the saturation mapping unit 760 includes a second conversion subunit 7610 and a second obtaining subunit 7620.

The second conversion subunit 7610 is configured to convert the temporary luminance value based on a preset saturation mapping curve, to obtain a saturation factor. For details, refer to descriptions of S2071. Details are not described herein.

The second obtaining subunit 7620 is configured to multiply a product of the saturation factor and a preset chrominance adjustment factor by a chrominance value of the chrominance component, to obtain an adjusted chrominance value. For details, refer to descriptions of S2072 Details are not described herein.

In a possible embodiment, the second conversion subunit 7610 is configured to determine, by using a second mapping relationship table, the saturation factor corresponding to the temporary luminance value, where the second mapping relationship table is used to store a horizontal coordinate value and a vertical coordinate value of at least one sampling point on the saturation mapping curve.

In a possible embodiment, a color format of the first luminance-chrominance signal includes a YUV format or a YCbCr format.

In this embodiment of this application, a to-be-processed HDR video signal may be converted into an SDR signal, so that the SDR signal is correctly displayed on a display device that supports the SDR signal. In this embodiment of this application, luminance processing may be first performed on the to-be-processed video signal in a linear space, and then, color gamut conversion is performed on a luminance-processed signal, and a color gamut-converted signal is converted into a non-linear space, a color space is converted, and saturation processing is performed, to output a signal that matches a format supported by a display-, so that the display correctly plays the video. This avoids problems such as picture distortion, inaccurate color performance, and loss of details. In addition, in this embodiment of this application, luminance processing and color gamut processing are combined, and after luminance of the video signal is processed, the chrominance component is correspondingly adjusted based on the luminance mapping curve and a luminance value of a luminance processing input signal, so that both the luminance and saturation of the video signal can be effectively adjusted. In the foregoing method, a relationship is formed for the luminance, a color gamut, and the saturation in terms of processing, so that signal conversion complexity is reduced, and signal conversion efficiency is improved.

Figure 10:
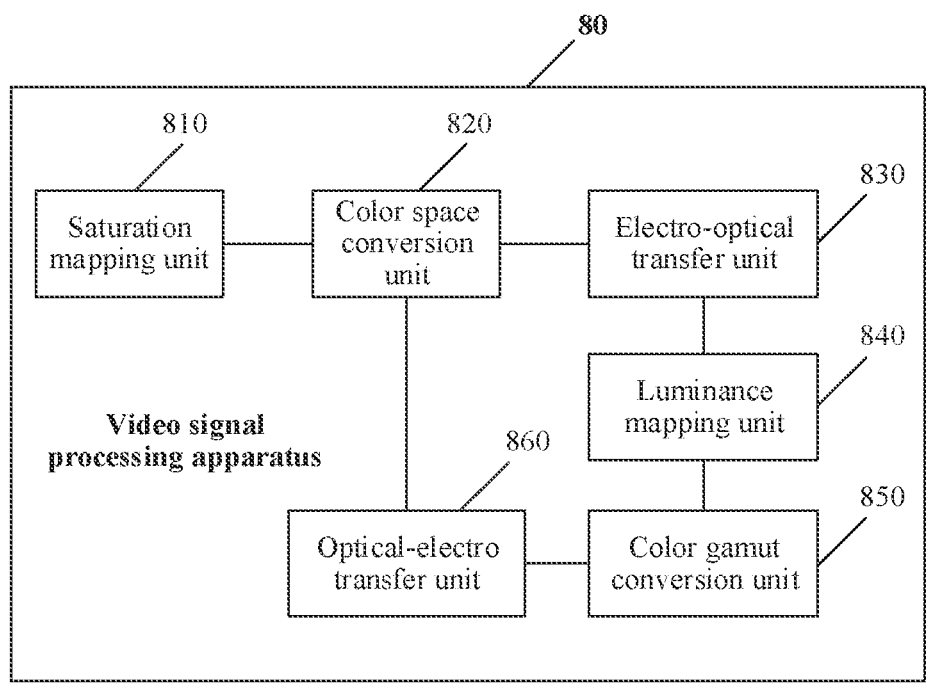
FIG. 10 is a structural diagram of an example video signal processing apparatus according to an embodiment of this application.

An embodiment of this application further provides another corresponding video signal processing apparatus. As shown in FIG. 10, a video signal processing apparatus 80 may include at least a saturation mapping unit 810, a color space conversion unit 820, an electro-optical transfer unit 830, a luminance mapping unit 840, a color gamut conversion unit 850, and an optical-electro transfer unit 860.

The saturation mapping unit 810 is configured to perform saturation mapping on a chrominance component of a to-be-processed video signal to obtain a first luminance-chrominance signal. For details, refer to descriptions of S501. Details are not described herein.

The color space conversion unit 820 is configured to perform color space conversion on the first luminance-chrominance signal to obtain a first non-linear RGB signal. For details, refer to descriptions of S502. Details are not described herein.

The electro-optical transfer unit 830 is configured to convert the first non-linear RGB signal based on an electro-optical transfer function, to obtain a first linear RGB signal. For details, refer to descriptions of S503. Details are not described herein.

The luminance mapping unit 840 is configured to perform luminance mapping on the first linear RGB signal to obtain a second linear RGB signal, where a luminance value range corresponding to the second linear RGB signal is the same as a luminance value range corresponding to a display device. For details, refer to descriptions of S504. Details are not described herein.

The color gamut conversion unit 850 is configured to perform color gamut conversion on the second linear RGB signal to obtain a third linear RGB signal, where a color gamut corresponding to the third linear RGB signal is the same as a color gamut corresponding to the display device. For details, refer to descriptions of S505. Details are not described herein.

The optical-electro transfer unit 860 is configured to convert the third linear RGB signal based on an optical-electro transfer function, to obtain a second non-linear RGB signal. For details, refer to descriptions of S506. Details are not described herein.

The color space conversion unit 820 is further configured to perform color space conversion on the second non-linear RGB signal to obtain a second luminance-chrominance signal. For details, refer to descriptions of S507. Details are not described herein.

In a possible embodiment, the to-be-processed video signal is a HDR signal, and the second luminance-chrominance signal is a SDR signal.

In a possible embodiment, the saturation mapping unit 810 may include a first conversion subunit 8110 and a first obtaining subunit 8120.

The first conversion subunit 8110 is configured to convert a luminance component of the to-be-processed video signal based on a preset saturation mapping curve, to obtain a saturation factor. For details, refer to descriptions of S5011. Details are not described herein.

The first obtaining subunit 8120 is configured to multiply a product of the saturation factor and a preset chrominance adjustment factor by a chrominance value of the chrominance component, to obtain an adjusted chrominance value. For details, refer to descriptions of S5012 Details are not described herein.

In a possible embodiment, the first conversion subunit is configured to determine, by using a first mapping relationship table, the saturation factor corresponding to the luminance component of the to-be-processed video signal, where the first mapping relationship table is used to store a horizontal coordinate value and a vertical coordinate value of at least one sampling point on the saturation mapping curve.

In a possible embodiment, the luminance mapping unit 840 may include a second calculation subunit 8410, a second conversion subunit 8420, and a second obtaining subunit 8430.

The second calculation subunit 8410 is configured to calculate a temporary luminance value based on each primary color value of the first linear RGB signal. For details, refer to descriptions of S4041. Details are not described herein.

The second conversion subunit 8420 is configured to convert the temporary luminance value based on a preset luminance mapping curve, to obtain an adjustment coefficient. For details, refer to descriptions of S4042. Details are not described herein.

The second obtaining subunit 8430 is configured to multiply each primary color value by the adjustment coefficient to obtain a second linear RGB signal. For details, refer to descriptions of S4043. Details are not described herein.

In a possible embodiment, the temporary luminance value is calculated according to the following formula:

$$Y = C_1 \times R + C_2 \times G + C_3 \times B \qquad (85),\text{ where}$$

Y is the temporary luminance value, R, G, and B are respectively primary color values of the first linear RGB signal, $C_1=0.2627$, $C_2=0.678$, and $C_3=0.0593$.

In a possible embodiment, the second conversion subunit is configured to determine, by using a second mapping relationship table, the adjustment coefficient corresponding to the temporary luminance value, where the second mapping relationship table is used to store a horizontal coordinate value and a vertical coordinate value of at least one sampling point on the luminance mapping curve.

In a possible embodiment, a color format of the first luminance-chrominance signal includes a YUV format or a YCbCr format.

It may be understood that, for descriptions of each unit, further refer to the foregoing embodiments of the video signal processing method. Details are not described herein.

This embodiment of this application is applicable to a scenario in which a to-be-processed HDR HLG signal is converted into an SDR signal, a scenario in which a to-be-processed HDR PQ signal is converted into an SDR signal, and a scenario in which a to-be-processed SDR signal is converted into an HDR HLG signal or an HDR PQ signal. In this embodiment of this application, the to-be-processed video signal can be correctly displayed on the display device. Saturation mapping is first performed on the to-be-processed video signal, and then, luminance mapping is performed on a saturation-mapped signal in a linear space, and then color gamut conversion is performed on a luminance-mapped signal, and a color gamut-converted signal is converted into a non-linear space and a color space is converted, to output a signal that matches a format supported by a display-, so that the display correctly plays the video. This avoids problems such as picture distortion, inaccurate color performance, and loss of details. In addition, in this embodiment of this application, luminance processing and color gamut processing are combined, and before luminance of the video signal is processed, the chrominance component is correspondingly adjusted based on the luminance mapping curve, so that both the luminance and saturation of the video signal can be effectively adjusted. In the foregoing method, a relationship is formed for the luminance, a color gamut, and the saturation in terms of processing, so that signal conversion complexity is reduced, and signal conversion efficiency is improved.

Figure 11:
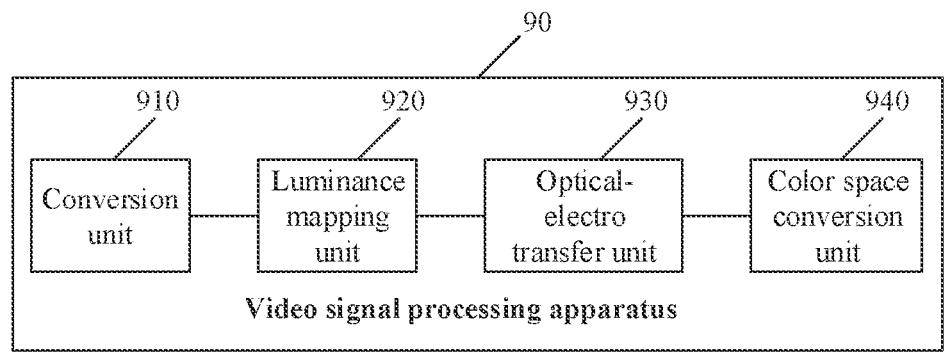
FIG. 11 is a structural diagram of an example video signal processing apparatus according to an embodiment of this application.

An embodiment of this application further provides another video signal processing apparatus. As shown in FIG. 11, a video signal processing apparatus 90 may include at least a conversion unit 910, a luminance mapping unit 920, an optical-electro transfer unit 930, and a color space conversion unit 940.

The conversion unit 910 is configured to perform color space conversion and non-linear space-to-linear space conversion on a to-be-processed video signal to obtain a first linear RGB signal. For details, refer to descriptions of S701. Details are not described herein.

The luminance mapping unit 920 is configured to convert the first linear RGB signal into a second linear RGB signal through luminance mapping. For details, refer to descriptions of S702. Details are not described herein.

The optical-electro transfer unit 930 is configured to convert the second linear RGB signal into a non-linear RGB signal based on an optical-electro transfer function. For details, refer to descriptions of S703. Details are not described herein.

The color space conversion unit 940 is configured to perform color space conversion on the non-linear RGB signal to obtain a processed video signal, where a signal format of the processed video signal adapts to a display device. For details, refer to descriptions of S704. Details are not described herein.

In a possible embodiment, the to-be-processed video signal is a hybrid log-gamma HLG signal, and the processed video signal is a perceptual quantizer (PQ) signal.

In a possible embodiment, the non-linear space-to-linear space conversion is an inverse process of HLG optical-electro transfer.

In a possible embodiment, the luminance mapping unit 920 may include a first calculation subunit 9210, an adjustment subunit 9220, and an obtaining subunit 9230.

The first calculation subunit 9210 is configured to calculate a scene luminance value based on each primary color value of the first linear RGB signal. For details, refer to descriptions of S7021. Details are not described herein.

The adjustment subunit 9220 is configured to adjust the scene luminance value based on a rated display luminance peak value and a system gamma value of a display device, to obtain a display luminance value. For details, refer to descriptions of S7022 Details are not described herein.

The obtaining subunit 9230 is configured to multiply each primary color value by a ratio of the display luminance value to the scene luminance value, to obtain the second linear RGB signal. For details, refer to descriptions of S7023. Details are not described herein.

In a possible embodiment, the display luminance value is obtained according to the following formula:

$$Y_d = Y_s^\gamma * L_W, \text{ where}$$

$Y_d$ is the display luminance value, $Y_s$ is the scene luminance value, $L_w$ is the rated display luminance peak value, $\gamma$ is the system gamma value, and $\gamma=1.2+0.42*\log_{10}(L_W/1000)$.

In this embodiment of this application, a to-be-processed HDR HLG signal may be converted into an HDR PQ signal, so that a video signal in an HDR HLG format can be correctly displayed on a display device that supports an HDR PQ signal format. This avoids problems such as picture distortion, inaccurate color performance, and loss of details.

It may be understood that, for descriptions of each unit, further refer to the foregoing embodiments of the video signal processing method. Details are not described herein.

In this application, the video signal processing apparatuses provided in the embodiments of FIG. 9, FIG. 10, and FIG. 11 may be a same apparatus, and locations and parameters of the units of the apparatuses are adjustable. Specifically, the locations and the parameters of the units included by the apparatuses may be adjusted based on a format of a to-be-processed video signal and a signal format supported by a display device, so that the apparatuses are applicable to each video signal conversion scenario.

Figure 12:
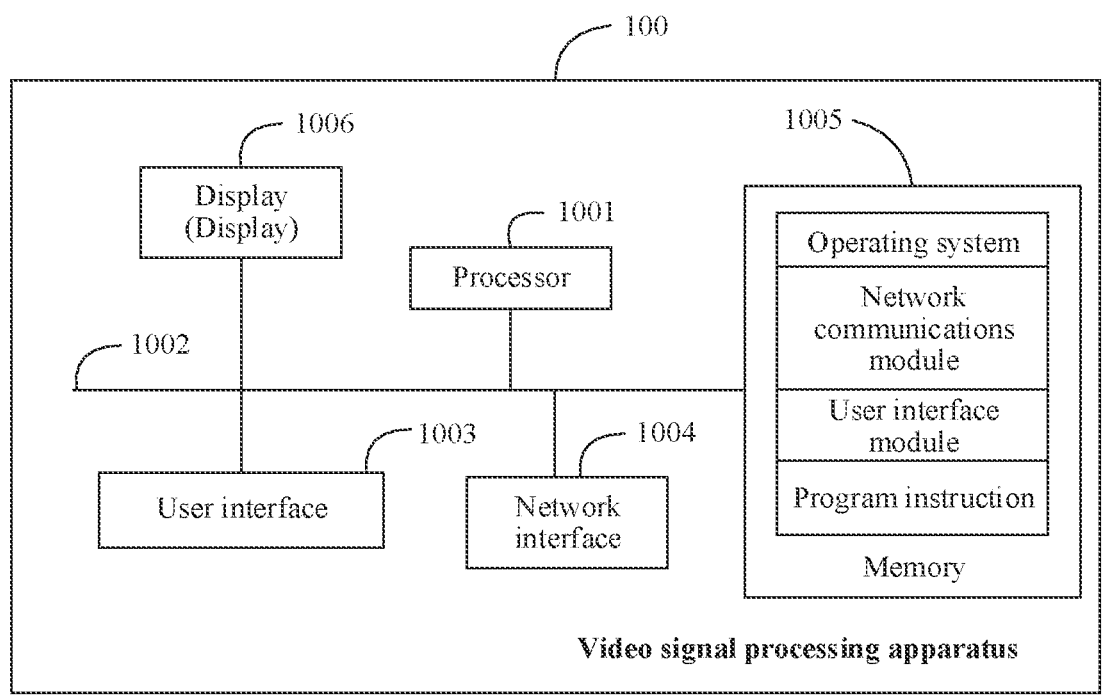
FIG. 12 is a structural diagram of another example video signal processing apparatus according to an embodiment of this application.

An embodiment of this application provides another video signal processing apparatus. As shown in FIG. 12, a video signal processing apparatus 100 may at least include at least one processor 1001, at least one network interface 1004, a user interface 1003, a memory 1005, at least one communications bus 1002, and a display screen 1006. The communications bus 1002 is configured to implement connection and communication between these components. It should be understood that, each component in the video signal processing apparatus 100 may be further coupled by using another connector, and the another connector may include various interfaces, transmission lines or buses, and the like. In each embodiment of this application, coupling means interconnection in a specific manner, including direct connection or indirect connection by using another device.

The processor 1001 may include at least one of the following types: a general central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 1001 may be a single-core (single-CPU) processor or a multi-core (multi-CPU) processor. A plurality of processors or units included in the processor 1001 may be integrated into one chip or located on a plurality of different chips. The user interface 1003 may include a physical button (a push button, a rocker button, and the like), a dial pad, a slider switch, a joystick, a click scroll wheel, an optical mouse (the optical mouse is a touch-sensitive surface that does not display visual output, or is an extension of a touch-sensitive surface including a touchscreen), and the like. The network interface 1004 may optionally include a standard wired interface and a wireless interface (such as a WI-FI interface). The memory 1005 may be a non-volatile memory, for example, an embedded multimedia card (EMMC), a universal flash storage (UFS), or a read-only memory (ROM). Optionally, the memory 1005 includes a flash in this embodiment of this application, or another type of static storage device that can store static information and an instruction, or may be a volatile memory, such as a random access memory (RAM) or another type of dynamic storage device that can store information and an instruction, or may be an electrically erasable programmable read-only memory (EEPROM), a compact disc read-only memory (CD-ROM) or another disk storage, an optical disc storage (including a compact disc, a laser disc, an optical disc, a digital general disc, a Blu-ray disc, and the like), a magnetic storage medium or another magnetic storage device, or any other computer-readable storage medium that can be used to carry or store program code with an instruction or in a data structure form and that can be accessed by a computer, but this is not limited thereto. Optionally, the memory 1005 may be at least one storage system that is far away from the processor 1001. As shown in FIG. 12, as a computer storage medium, the memory 1005 may include an operating system, a network communications module, a user interface module, and a program instruction.

The memory 1005 may exist independently, and is coupled to the processor 1001 by using a connector. The memory 1005 may be alternatively integrated with the processor 1001. The memory 1005 can store various computer program instructions including a program instruction for executing this application, and execution is controlled by the processor 1001. The executed various computer program instructions may also be considered as a driver program of the processor 1001. For example, the processor 1001 is configured to execute the computer program instruction stored in the memory 1005, to implement the methods in the method embodiments in this application. There are an extremely large quantity of computer program instructions, and the computer program instructions may form a computer executable instruction that can be executed by at least one processor in the processor 1001, to drive a related processor to perform various types of processing, for example, a communications signal processing algorithm supporting the foregoing various wireless communications protocols, running of an operating system, or running of an application program.

The display screen 1006 is configured to display information entered by a user. For example, the display screen 1006 may include a display panel and a touch panel. The display panel may be configured by using a liquid crystal display (LCD), an organic light-emitting diode (OLED), a light-emitting diode (LED) display device, a cathode ray tube (CRT), or the like. The touch panel, also referred to as a touchscreen, may collect a contact operation or a non-contact operation performed by a user on or near the touch panel (for example, an operation performed by the user on the touch panel or near the touch panel by using any suitable object or accessory such as a finger or a stylus, which may further include a body sense operation, where the operation includes operation types such as a single-point control operation and a multi-point control operation), and drive a corresponding connection apparatus based on a preset program.

In this embodiment of this application, when a format of a video received by a player is inconsistent with a video format supported by a display, the formal of the received video may be converted, to make the format consistent with the video format supported by the display, so that the display correctly play s the video. This avoids problems such as picture distortion, inaccurate color performance, and loss of details.

Persons of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. For a type of the storage medium, refer to descriptions of the memory 1005.

An embodiment of this application further provides a computer-readable storage medium, the computer-readable storage medium stores an instruction, and when the instruction is run on a computer or a processor, the computer or the processor is enabled to perform one or more steps in any one of the foregoing video signal processing methods. When being implemented in the form of a software functional unit and sold or used as an independent product, the modules in the foregoing apparatus may be stored in the computer-readable storage medium.

Based on such an understanding, the technical solutions of the embodiments of this application essentially, or the part contributing to the prior art, or all or some of the technical solutions may be implemented in the form of a software product. The software product is stored in a storage medium and includes several instructions for instructing a playing device or a processor in the playing device to perform all or some of the steps of the methods described in the embodiments of this application. For a type of the storage medium, refer to related descriptions of the memory 1005.

Figure 13:
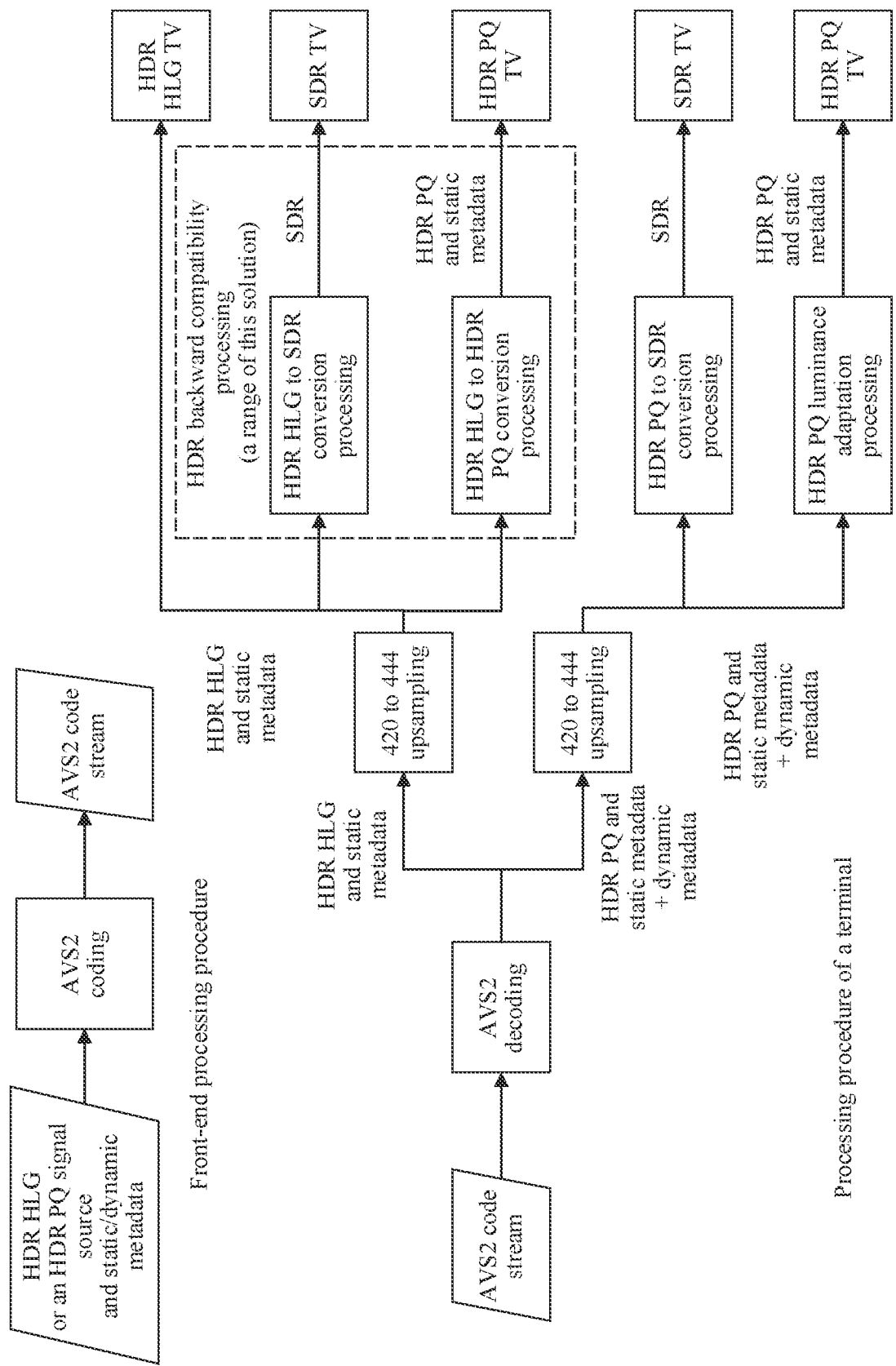
FIG. 13 is a block diagram of a technical solution of an HDR terminal according to an embodiment of this application.

A specific implementation of the video signal processing method provided in the embodiments of this application relates to a technical solution of an HDR terminal, and a relationship diagram of a technical framework and a related range of the HDR terminal in an entire video end-to-end system is shown in FIG. 13.

An HDR input signal source supported in a specific implementation of the video signal processing method provided in the embodiments of this application is an AVS2 code stream received by a terminal. After decoding, a 10-bit integer-type YCbCr color difference signal in a 4:2:0 format (referred to as a YCC signal for short below, and is not described in this specification again) and related HDR static or dynamic metadata are obtained.

The foregoing YCC HDR signal may be in the following several formats:

| Program type | Resolution | Frame rate | Quantization precision | Color gamut | Conversion curve | Metadata |
| --- | --- | --- | --- | --- | --- | --- |
| HDR-PQ | 3840 × 2160 | 50P | 10 bits | BT.2020 | PQ | Static or static + dynamic metadata |
| HDR-HLG | 3840 × 2160 | 50P | 10 bits | BT.2020 | HLG | No |
|  | 3840 × 2160 | 50P | 10 bits | BT.2020 | HLG | Static metadata |

For reference, encapsulation of video parameters of a 4K ultra-high definition television program in the AVS2 code stream is shown in the following table.

|  | Value | |
| --- | --- | --- |
| Parameter | HDR-PQ program | HDR-HLG program |
| colour_primaries | 9 | 9 |
| transfer_characteristics | 12 | 14 |
| matrix_coefficients | 8 | 8 |
| Static metadata of a sequence header | Yes | Yes when maximum luminance of a video is not 1000 nits |
| Dynamic metadata of an image header | Yes | No |

In a specific implementation of the video signal processing method provided in the embodiments of this application, due to a difference in production time, TVs that may be interconnected by the terminal may differ greatly in terms of a capability for supporting an HDR signal. Usually, an old TV model cannot support a new signal format. Therefore, a decoding terminal needs to perform compatibility adaptation based on a difference in capabilities of the TVs for supporting the HDR signal.

Based on different receiving and processing capabilities of the TV's for the HDR signal, a terminal device may need to divide interconnected TVs into the following types:

| Television set type | Color gamut | Conversion curve |
| --- | --- | --- |
| Type 1 | BT.709 | Gamma |
| Type 2 | BT.2020 | Gamma |
| Type 3 | BT.2020 | Supporting PQ |
| Type 4 | BT.2020 | Supporting PQ and HLG |

In a specific implementation of the video signal processing method provided in the embodiments of this application, to transmit an HBR HLG signal to the foregoing types of TVs, signal conversion processing listed in the following table is performed, to implement compatibility adaptation between the signal and the TV

| | Television set type | | | |
| --- | --- | --- | --- | --- |
| Output parameter | Type 1 | Type 2 | Type 3 | Type 4 |
| Color gamut | BT.709 | BT.709 | BT.2020 | BT.2020 |
| Curve | Gamma | Gamma | PQ | HLG |

In the foregoing table, a television set of the type 2 generally also has a capability of processing a signal in a BT.709 color gamut. Therefore, in this embodiment of this application, for the television set of the type 2, an HBR HLG signal is also converted into the BT.709 color gamut and sent to the television set of the type 2.

In this embodiment of this application, after the to-be-processed video signal is converted, an effect test may be performed on a converted output signal. A specific test method is as follows: A to-be-evaluated image and a reference image are continuously played to an observer for a specific period of time based on each test scheme described subsequently, and then, after playing, a specific time interval is set for the observer to score. Finally, all given scores are averaged as an evaluation value of this sequence, in other words, an evaluation value of the to-be-evaluated image.

With reference to a scoring rule for image quality and damage in BT.500-13, a plurality of testers score various test objects based on scoring criteria in the following table.

| 5-point scoring method | |
| --- | --- |
| Quality score | Image quality damage assessment |
| 5: Excellent | No deterioration in image quality can be seen. |
| 4: Good | Deterioration in image quality can be seen, but viewing is not affected. |
| 3: Mediocre | Deterioration in image quality can be clearly seen, and viewing is slightly affected. |
| 2: Poor | Viewing is affected. |
| 1: Very poor | Viewing is severely affected. |

In a specific implementation of the video signal processing method provided in the embodiments of this application, a test solution in a scenario in which an HDR HLG signal adapts to an SDR TV is described as follows:

Test objective, to describe, through contrasting and testing, whether image adaptation conversion from HLG to SDR can provide beneficial image effects when an HDR HLG signal is sent to an SDR TV.

DUT: to convert HLG into SDR 709.

BenchMark1: to view HLG in SDR BT.709.

BenchMark2: to view HLG on an HDR HLG TV in an HLG BT.2020 mode.

Figure 14:
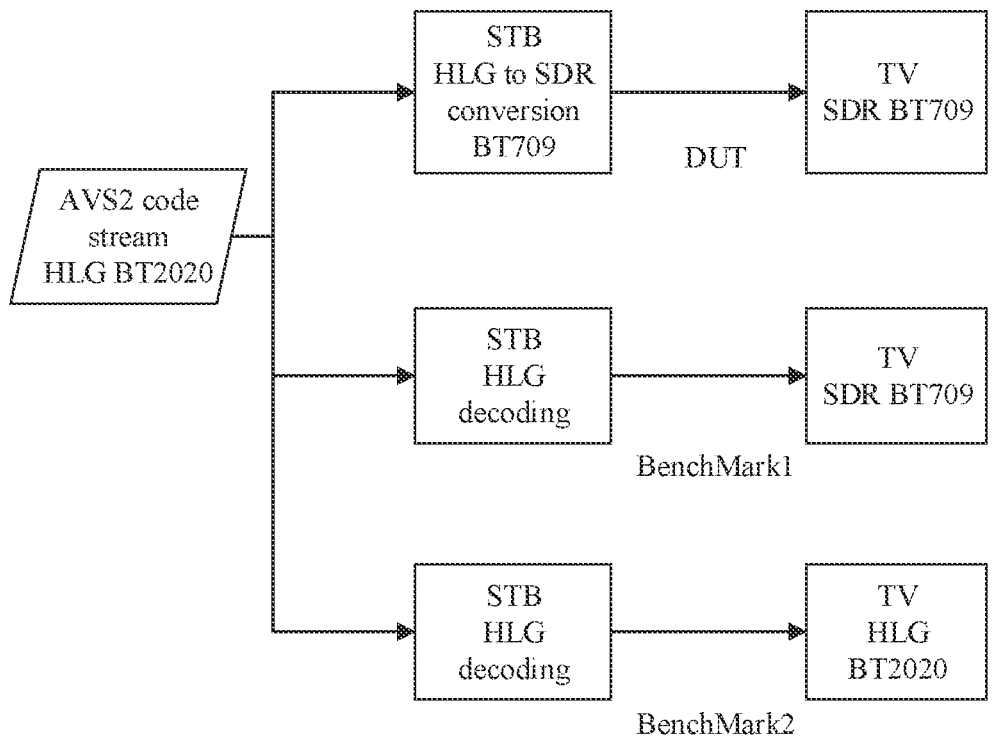
FIG. 14 is a schematic diagram of a test networking manner in which an HDR HLG signal adapts to an SDR TV according to an embodiment of this application.

A schematic diagram of a test networking manner in a scenario in which an HDR HLG signal adapts to an SDR TV is shown in FIG. 14. In a specific implementation of the video signal processing method provided in the embodiments of this application, a test solution in a scenario in which an HDR HLG signal adapts to an HDR PQ TV is described as follows:

DUT: to convert HLG into HDR PQ BT.2020.

Benchmark1: to view HLG on an HDR PQ TV in an SDR BT.709 mode.

Benchmark2: to view HLG on an HDR PQ TV in an HLG BT.2020 mode.

Figure 15:
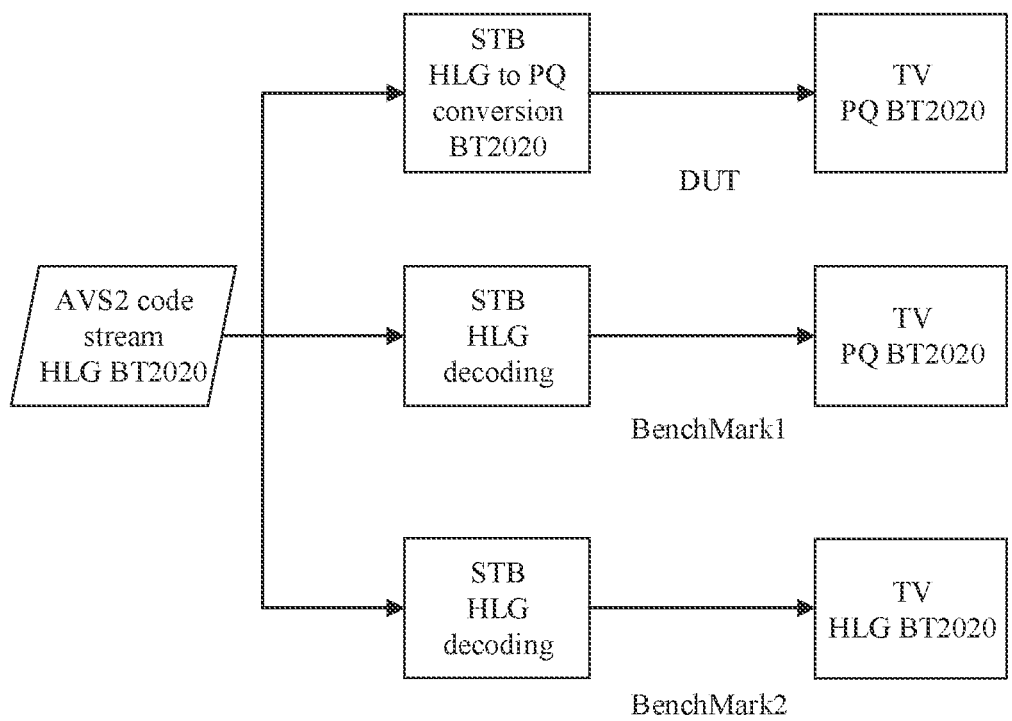
FIG. 15 is a schematic diagram of a test networking manner in which an HDR HLG signal adapts to an HDR PQ TV according to an embodiment of this application.

A schematic diagram of a test networking manner in a scenario in which an HDR HLG signal adapts to an HDR PQ TV is shown in FIG. 15.

A sequence of the steps of the method in the embodiments of this application may be adjusted, combined, or deleted based on an actual requirement.

The modules in the apparatus in the embodiments of this application may be combined, divided, or deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A video signal processing method, comprising:
performing color space conversion on a to-be-processed video signal to obtain a first non-linear red green blue (RGB) signal;
converting the first non-linear RGB signal based on an electro-optical transfer function, to obtain a first linear RGB signal;
performing luminance mapping on the first linear RGB signal to obtain a second linear RGB signal, wherein a luminance value range corresponding to the second linear RGB signal is the same as a luminance value range corresponding to a display device, and the performing luminance mapping comprises:
calculating a temporary luminance value based on each primary color value of the first linear RGB signal;
converting the temporary luminance value based on a preset luminance mapping curve, to obtain an adjustment coefficient; and
multiplying each primary color value by the adjustment coefficient to obtain the second linear RGB signal;
converting the second linear RGB signal based on an optical-electro transfer function, to obtain a second non-linear RGB signal;
performing color space conversion on the second non-linear RGB signal to obtain a first luminance-chrominance signal; and
performing saturation mapping on a chrominance component of the first luminance-chrominance signal to obtain a second luminance-chrominance signal, wherein the performing saturation mapping comprises:
converting the temporary luminance value based on a preset saturation mapping curve, to obtain a saturation factor; and
multiplying the saturation factor by a chrominance value of the chrominance component, to obtain an adjusted chrominance value.

2. The method according to claim 1, wherein the to-be-processed video signal is a high dynamic range (HDR) signal, and the second luminance-chrominance signal is a standard dynamic range (SDR) signal.

3. The method according to claim 1, wherein the temporary luminance value is calculated according to the following formula:

$$Y = C_1 \times R + C_2 \times G + C_3 \times B, \text{ where}$$

Y is the temporary luminance value, R, G, and B are respectively primary color values of the first linear RGB signal, C1=0.2627, C2=0.678, and C3=0.0593.

4. The method according to claim 3, wherein the performing saturation mapping on the chrominance component of the first luminance-chrominance signal further comprises:
multiplying the product of the saturation factor and the chrominance value of the chrominance component by a preset chrominance adjustment factor, to obtain the adjusted chrominance value.

5. The method according to claim 1, wherein the converting the temporary luminance value based on a preset luminance mapping curve comprises:
determining, by using a first mapping relationship table, the adjustment coefficient corresponding to the temporary luminance value, wherein the first mapping relationship table stores a horizontal coordinate value and a vertical coordinate value of at least one sampling point on the luminance mapping curve.

6. The method according to claim 1, wherein the converting the temporary luminance value based on a preset saturation mapping curve comprises:
determining, by using a second mapping relationship table, the saturation factor corresponding to the temporary luminance value, wherein the second mapping relationship table stores a horizontal coordinate value and a vertical coordinate value of at least one sampling point on the saturation mapping curve.

7. The method according to claim 1, wherein a color format of the first luminance-chrominance signal comprises a YUV format or a YCbCr format.

8. A video signal processing apparatus, comprising:
at least one processor;
and a memory, coupled to the at least one processor and storing one or more instructions that, when executed by the at least one processor, cause the video signal processing apparatus to:
perform color space conversion on a to-be-processed video signal to obtain a first non-linear red green blue (RGB) signal;
convert the first non-linear RGB signal based on an electro-optical transfer function, to obtain a first linear RGB signal;
perform luminance mapping on the first linear RGB signal to obtain a second linear RGB signal, wherein a luminance value range corresponding to the second linear RGB signal is the same as a luminance value range corresponding to a display device, the performing luminance mapping comprises:
calculating a temporary luminance value based on each primary color value of the first linear RGB signal;
converting the temporary luminance value based on a preset luminance mapping curve, to obtain an adjustment coefficient; and
multiplying each primary color value by the adjustment coefficient to obtain the second linear RGB signal;
convert the second linear RGB signal based on an optical-electro transfer function, to obtain a second non-linear RGB signal;
perform color space conversion on the second non-linear RGB signal to obtain a first luminance-chrominance signal; and
perform saturation mapping on a chrominance component of the first luminance-chrominance signal to obtain a second luminance-chrominance signal, wherein the performing saturation mapping comprises:
converting the temporary luminance value based on a preset saturation mapping curve, to obtain a saturation factor; and
multiplying the saturation factor by a chrominance value of the chrominance component, to obtain an adjusted chrominance value.

9. The apparatus according to claim 8, wherein the to-be-processed video signal is a high dynamic range (HDR) signal, and the second luminance-chrominance signal is a standard dynamic range (SDR) signal.

10. The apparatus according to claim 8, wherein the temporary luminance value is calculated according to the following formula:

$$Y = C_1 \times R + C_2 \times G + C_3 \times B, \text{ where}$$

Y is the temporary luminance value, R, G, and B are respectively primary color values of the first linear RGB signal, C1=0.2627, C2=0.678, and C3=0.0593.

11. The apparatus according to claim 8, wherein the instructions further cause the at least one processor to:
determine, by using a first mapping relationship table, the adjustment coefficient corresponding to the temporary luminance value, wherein the first mapping relationship table is used to store a horizontal coordinate value and a vertical coordinate value of at least one sampling point on the luminance mapping curve.

12. The apparatus according to claim 10, wherein the instructions further cause the at least one processor to:
multiply the product of the saturation factor and the chrominance value of the chrominance component by a preset chrominance adjustment factor, to obtain the adjusted chrominance value.

13. The apparatus according to claim 8, wherein the instructions further cause the at least one processor to:
determine, by using a second mapping relationship table, the saturation factor corresponding to the temporary luminance value, wherein the second mapping relationship table stores a horizontal coordinate value and a vertical coordinate value of at least one sampling point on the saturation mapping curve.

14. The apparatus according to claim 8, wherein a color format of the first luminance-chrominance signal comprises a YUV format or a YCbCr format.

15. A non-transitory computer-readable storage medium, wherein the computer-readable storage medium comprises computer-executable instruction, when the instruction is executed by at least one processor, cause an apparatus to:
perform color space conversion on a to-be-processed video signal to obtain a first non-linear red green blue (RGB) signal;
convert the first non-linear RGB signal based on an electro-optical transfer function, to obtain a first linear RGB signal;
perform luminance mapping on the first linear RGB signal to obtain a second linear RGB signal, wherein a luminance value range corresponding to the second linear RGB signal is the same as a luminance value range corresponding to a display device, the performing luminance mapping comprises:

calculating a temporary luminance value based on each primary color value of the first linear RGB signal;

converting the temporary luminance value based on a preset luminance mapping curve, to obtain an adjustment coefficient; and multiplying each primary color value by the adjustment coefficient to obtain the second linear RGB signal;

convert the second linear RGB signal based on an optical-electro transfer function, to obtain a second non-linear RGB signal;

perform color space conversion on the second non-linear RGB signal to obtain a first luminance-chrominance signal; and perform saturation mapping on a chrominance component of the first luminance-chrominance signal to obtain a second luminance-chrominance signal, wherein the performing saturation mapping comprises:

converting the temporary luminance value based on a preset saturation mapping curve, to obtain a saturation factor; and multiplying the saturation factor by a chrominance value of the chrominance component, to obtain an adjusted chrominance value.

16. The computer-readable storage medium according to claim 15, wherein the temporary luminance value is calculated according to the following formula:

$$Y = C_1 \times R + C_2 \times G + C_3 \times B, \text{ where}$$

Y is the temporary luminance value, R, G, and B are respectively primary color values of the first linear RGB signal, C1=0.2627, C2=0.678, and C3=0.0593.

17. The computer-readable storage medium according to claim 16, wherein the instruction further causes the apparatus to:

multiply the product of the saturation factor and the chrominance value of the chrominance component by a preset chrominance adjustment factor, to obtain the adjusted chrominance value.

* * * * *